(12) United States Patent
Labeque et al.

(10) Patent No.: US 10,240,114 B2
(45) Date of Patent: Mar. 26, 2019

(54) ARTICLES COMPRISING WATER-SOLUBLE POLYVINYL ALCOHOL BLEND FILM AND RELATED METHODS

(71) Applicant: The Procter & Gamble Company, Cincinnati, OH (US)

(72) Inventors: Regine Labeque, Neder Over Heembeek (BE); Florence Catherine Courchay, Brussels (BE); Robby Renilde François Keuleers, Lippelo Sint Amands (BE); Steven George Friedrich, Crown Point, IN (US); David M. Lee, Crown Point, IN (US); Thomas J. Yogan, Valparaiso, IN (US)

(73) Assignee: The Procter & Gamble Company, Cincinnati, OH (US)

( * ) Notice: Subject to any disclaimer, the term of this patent is extended or adjusted under 35 U.S.C. 154(b) by 61 days.

(21) Appl. No.: 14/881,190

(22) Filed: Oct. 13, 2015

(65) Prior Publication Data

US 2016/0102278 A1   Apr. 14, 2016

Related U.S. Application Data

(60) Provisional application No. 62/063,098, filed on Oct. 13, 2014.

(51) Int. Cl.
*C11D 17/04* (2006.01)
*C11D 11/00* (2006.01)
(Continued)

(52) U.S. Cl.
CPC .............. *C11D 17/042* (2013.01); *C08J 5/18* (2013.01); *C11D 17/043* (2013.01);
(Continued)

(58) Field of Classification Search
None
See application file for complete search history.

(56) References Cited

U.S. PATENT DOCUMENTS

| | | |
|---|---|---|
| 2,220,099 A | 11/1940 | Guenther et al. |
| 2,477,383 A | 7/1949 | Lewis |

(Continued)

FOREIGN PATENT DOCUMENTS

| | | |
|---|---|---|
| DE | 1466799 A | 3/1977 |
| DE | 8919254 A | 10/1989 |

(Continued)

OTHER PUBLICATIONS

U.S. Appl. No. 14/881,195, filed Oct. 13, 2015, Regine Labeque.
(Continued)

*Primary Examiner* — Lorna M Douyon
(74) *Attorney, Agent, or Firm* — Gregory S. Darley-Emerson

(57) ABSTRACT

Articles that include water-soluble films and household care composition, where the films include a polyvinyl alcohol (PVOH) resin blend and optionally one or more additional components such as plasticizers, fillers, surfactants, and other additives. The PVOH resin blend includes a PVOH copolymer including one or more types of anionic monomer units such as a PVOH terpolymer and a PVOH polymer such as another PVOH anionic copolymer or a partially or completely hydrolyzed PVOH homopolymer. When the PVOH copolymer and PVOH polymer are blended in particular proportions and/or selected with regard to various criteria related to physical and chemical film properties, the resulting water-soluble film formed from the PVOH resin blend exhibits substantially improved aqueous dissolution properties, tensile strength properties, and/or tensile modulus properties.

22 Claims, 2 Drawing Sheets

(51) Int. Cl.
*C08J 5/18* (2006.01)
*D06L 1/00* (2017.01)

(52) U.S. Cl.
CPC .......... *C11D 17/044* (2013.01); *C11D 17/045* (2013.01); *C08J 2300/14* (2013.01); *C08J 2329/04* (2013.01); *C08J 2429/04* (2013.01)

(56) References Cited

U.S. PATENT DOCUMENTS

| | | | |
|---|---|---|---|
| 3,664,961 | A | 5/1972 | Norris |
| 3,929,678 | A | 12/1975 | Laughlin et al. |
| 3,975,280 | A | 8/1976 | Hachmann et al. |
| 4,000,093 | A | 12/1976 | Nicol et al. |
| 4,075,116 | A | 2/1978 | Mesaros |
| 4,222,905 | A | 9/1980 | Cockrell, Jr. |
| 4,239,659 | A | 12/1980 | Murphy |
| 4,259,217 | A | 3/1981 | Murphy |
| 4,810,410 | A | 3/1989 | Diakun et al. |
| 5,114,611 | A | 5/1992 | Van Kralingen et al. |
| 5,137,646 | A | 8/1992 | Schmidt et al. |
| 5,227,084 | A | 7/1993 | Martens et al. |
| 5,340,496 | A | 8/1994 | Sato et al. |
| 5,378,759 | A * | 1/1995 | Amici ............... C08L 29/04 428/500 |
| 5,576,281 | A | 11/1996 | Bunch et al. |
| 6,166,117 | A | 12/2000 | Miyazaki |
| 6,599,871 | B2 | 7/2003 | Smith |
| 6,787,512 | B1 * | 9/2004 | Verrall ............... C11D 17/043 428/35.2 |
| 6,855,680 | B2 | 2/2005 | Smerznak et al. |
| 6,956,070 | B2 | 10/2005 | Fujiwara et al. |
| 8,268,914 | B2 | 9/2012 | Verrall et al. |
| 8,276,756 | B2 | 10/2012 | Denome et al. |
| 8,288,332 | B2 | 10/2012 | Fossum et al. |
| 8,524,646 | B2 | 9/2013 | Ricci et al. |
| 9,404,071 | B2 | 8/2016 | Labeque et al. |
| 9,624,457 | B2 | 4/2017 | Labeque et al. |
| 2003/0060390 | A1 | 3/2003 | Demeyere et al. |
| 2004/0092635 | A1 * | 5/2004 | Kitamura ............ C08J 5/18 524/386 |
| 2004/0204337 | A1 | 10/2004 | Corona, III et al. |
| 2006/0275567 | A1 * | 12/2006 | Vicari ............... C11D 3/3753 428/35.7 |
| 2007/0219111 | A1 | 9/2007 | Ward et al. |
| 2009/0291282 | A1 * | 11/2009 | Kitamura ............ C08J 5/18 428/220 |
| 2009/0312220 | A1 * | 12/2009 | Boutoille ........... C11D 3/40 510/277 |
| 2011/0023240 | A1 * | 2/2011 | Fossum ............ C11D 1/62 8/137 |
| 2011/0189413 | A1 | 8/2011 | Denome et al. |
| 2014/0162929 | A1 | 6/2014 | Labeque et al. |
| 2014/0199460 | A1 | 7/2014 | Lee et al. |
| 2015/0158646 | A1 | 6/2015 | Meier et al. |
| 2015/0267154 | A1 | 9/2015 | Labeque et al. |
| 2016/0102278 | A1 | 4/2016 | Labeque et al. |

FOREIGN PATENT DOCUMENTS

| | | |
|---|---|---|
| EP | 197434 B1 | 10/1986 |
| EP | 0884352 A1 * | 12/1998 |
| EP | 1400460 A1 | 10/2001 |
| EP | 1400460 B1 | 11/2004 |
| EP | 1512701 A1 * | 3/2005 |
| EP | 1512701 A1 | 3/2005 |
| EP | 1907524 B1 * | 3/2012 |
| EP | 2397539 B1 | 3/2013 |
| EP | 2740785 A1 * | 6/2014 |
| GB | 1137741 A | 12/1968 |
| JP | 09324096 | 12/1997 |
| JP | 2006/063242 | 3/2006 |
| JP | 2006063242 A | 3/2006 |
| WO | WO9422800 A1 | 10/1994 |
| WO | WO2009152031 A1 | 12/2009 |
| WO | WO2010034736 A1 | 4/2010 |
| WO | WO2014026856 A1 | 2/2014 |
| WO | WO2014/089386 A1 * | 6/2014 |
| WO | WO2014110356 A1 | 7/2014 |
| WO | WO 2016/061069 A2 | 4/2016 |

OTHER PUBLICATIONS

PCT Search Report for International application No. PCT/US2015/055253, dated Feb. 1, 2016, containing 13 pages.
PCT Search Report for International application No. PCT/US2015/055282, dated Jan. 18, 2016, containing 8 pages.
PCT Search Report for International application No. PCT/US2015/055252, dated Feb. 10, 2016, containing 15 pages.
Database WPI Week 200622 Thomson Scientific, London, GB; AN 2006-207634 XP002753313.
MonoSol Office Action for appl. 15519035, dated Aug. 2, 2018, 30 pages.
MonoSol Search Report for application No. PCT/US20151055207, dated Jan. 11, 2016, 9 pages.

* cited by examiner

ARTICLES COMPRISING WATER-SOLUBLE POLYVINYL ALCOHOL BLEND FILM AND RELATED METHODS

FIELD OF THE DISCLOSURE

The disclosure relates generally to articles that include water-soluble films and a household care composition, where the films include a blend of polyvinyl alcohol (PVOH) resins and which can be used for contact with liquids, solids, or combinations thereof. The disclosure further relates to methods of making the films as well as articles, such as packets and pouches, made from the films, which are optionally filled with active components, e.g., detergents, to make measured dose pouches. More particularly, the disclosure relates to such films, articles, packets, and pouches with one or more benefits such as improved solubility characteristics for end uses and/or resistance to change in solubility characteristics upon contact with chemicals, together with suitable processability.

BACKGROUND

Water-soluble polymeric films are commonly used as packaging materials to simplify dispersing, pouring, dissolving and dosing of a material to be delivered. For example, packets made from water-soluble film are commonly used to package household care compositions, e.g., a pouch containing a laundry or dish detergent. A consumer can directly add the pouch to a mixing vessel, such as a bucket, sink or washing machine. Advantageously, this provides for accurate dosing while eliminating the need for the consumer to measure the composition. The pouch may also reduce mess that would be associated with dispensing a similar composition from a vessel, such as pouring a liquid laundry detergent from a bottle. The pouch also insulates the composition therein from contact with the user's hands. In sum, soluble polymeric film packets containing pre-measured agents provide for convenience of consumer use in a variety of applications.

Some water-soluble polymeric films that are used to make articles such as packets will incompletely dissolve during a wash cycle, leaving film residue on items within the wash. Such problems may particularly arise when the pouch is used under stressed wash conditions, such as when the pouch is used in cold water (e.g., water at as low as 5° C. and/or up to 10° C. or 15° C.), in a short wash cycle, and/or in a low-water wash cycle (e.g., wash liquors from about 3 L to about 20 L). Notably, environmental concerns and energy cost are driving consumer desire for utilizing colder wash water and shorter wash cycles.

There remains a need for water-soluble films and related articles having the desired characteristics of good water solubility (e.g., cold water solubility), chemical resistance, chemical and physical compatibility with laundry actives or other compositions in contact with the film or pouch formed therefrom, and desirable mechanical properties including good processability.

SUMMARY

The present disclosure relates to articles comprising a water-soluble film and a household care composition proximal to the film, where the film includes a polyvinyl alcohol (PVOH) resin blend and optionally one or more additional components including plasticizers, fillers, surfactants, and other additives. The PVOH resin blend includes a PVOH copolymer including one or more types of anionic monomer units (e.g., a PVOH terpolymer) and a PVOH polymer (e.g., another PVOH anionic copolymer, or a partially or completely hydrolyzed PVOH homopolymer). When the PVOH copolymer and PVOH polymer are blended in particular proportions and/or selected with regard to various criteria related to physical and chemical film properties, the resulting water-soluble film formed from the PVOH resin blend exhibits a beneficial combination of two or more of aqueous dissolution properties, tensile strength properties, and tensile modulus properties relative to both (i) comparable films formed from single PVOH anionic copolymers (e.g., one of the PVOH anionic copolymers in the blend) and (ii) comparable films formed from blends of the same PVOH copolymer and PVOH polymer species outside the selected proportions. Reduction or elimination of aqueous dissolution residue is particularly desirable in various washing operations, for example when a pouch formed from the water-soluble film and containing a cleaning composition (e.g., a laundry or dishwashing cleaning composition) is used to clean one or more articles (e.g., laundry or dishware), insofar as it is desirable for the cleaned articles to be free from polymeric film residue. Similarly, improved physical properties including mechanical properties such as film tensile strength and/or modulus permit the film to be formed into a composition-containing pouch which maintains its structural integrity prior to use (e.g., during manufacturing and storage prior to using the pouch in a washing operation).

The present disclosure also relates to an article comprising a water-soluble film and a household care composition proximal to the film, where the film includes: a polyvinyl alcohol (PVOH) resin blend including: a first PVOH copolymer including a first anionic monomer unit, the first PVOH copolymer having a first level of incorporation ($a_1$) of the first anionic monomer unit; and a second PVOH polymer. In a particular refinement, the second PVOH polymer is a PVOH copolymer including a second anionic monomer unit, the second PVOH copolymer having a second level of incorporation ($a_2$) of the second anionic monomer unit; $a_1-a_2$ is greater than zero, the first anionic monomer unit and the second anionic monomer unit are the same or different, and the first PVOH copolymer is present in an amount in a range from about 10 wt. % to about 75 wt. % of total PVOH polymers and PVOH copolymers in the film (e.g., where the second PVOH polymer or copolymer can be present in an amount in a range of about 25 wt. % to about 90 wt. % of total PVOH polymers and PVOH copolymers in the film). In another refinement, the second PVOH polymer is a PVOH copolymer including a second anionic monomer unit, the second PVOH copolymer having a second level of incorporation ($a_2$) of the second anionic monomer unit; $a_1-a_2$ is greater than zero, the first anionic monomer unit and the second anionic monomer unit are the same or different, and the first anionic monomer unit and the second anionic monomer unit are present in a combined amount in a range of about 2.0 mol. % to about 3.5 mol. % of total PVOH polymers and PVOH copolymers in the film.

The present disclosure also relates to an article including a water-soluble film and a household care composition proximal to the film, where the film includes: a polyvinyl alcohol (PVOH) resin blend including: a first PVOH copolymer including a first anionic monomer unit; and a second PVOH polymer (e.g., a second PVOH copolymer including a second anionic monomer unit); wherein the water-soluble film has the following property (a) and optionally at least one of the properties (b) and (c): (a) the water-soluble film has a residue value of about 48 wt. % or less as measured by the Dissolution Chamber Test; (b) the water-soluble film has an average tensile strength value of at least about 33 MPa as measured by the Tensile Strength Test; and (c) the water-soluble film has a modulus value of at least about 12 N/mm$^2$ as measured by the Modulus Test. In various refinements, the water-soluble film further has the property (b), the property (c), or both properties (b) and (c).

The present disclosure also relates to an article including a water-soluble film and a household care composition, where the film includes: a polyvinyl alcohol (PVOH) resin blend including: a first PVOH copolymer including a first anionic monomer unit; and a second PVOH polymer (e.g., a second PVOH copolymer including a second anionic monomer unit); wherein the water-soluble film has the following property (a) and optionally one or both of the properties (b) and (c): (a) the water-soluble film has a residue value in a range of about 12 wt. % to about 48 wt. % as measured by the Dissolution Chamber Test; (b) the water-soluble film has an average tensile strength value of at least about 33 MPa as measured by the Tensile Strength Test; and (c) the water-soluble film has a modulus value of at least about 12 N/mm$^2$ as measured by the Modulus Test. In various refinements, the water-soluble film further has the property (b), the property (c), or both properties (b) and (c).

The present disclosure also relates to an article including a water-soluble film and a household care composition proximal to the film, where the film includes: a polyvinyl alcohol (PVOH) resin blend comprising: a first PVOH copolymer comprising a first anionic monomer unit; and a second PVOH polymer consisting essentially of vinyl alcohol monomer units and optionally vinyl acetate monomer units; wherein the first PVOH copolymer is present in an amount in a range of about 30 wt. % to about 70 wt. % of total PVOH polymers and PVOH copolymers in the film (e.g., where the second PVOH polymer can be present in an amount in a range of about 30 wt. % to about 70 wt. % of total PVOH polymers and PVOH copolymers in the film).

The present disclosure also relates to an article comprising a water-soluble film of any of the various disclosed embodiments in the form of a pouch defining an interior pouch volume (e.g., further comprising the household care composition contained in the interior pouch volume).

In a particular refinement of the various embodiments, the first anionic monomer is selected from the group consisting of acrylamido methylpropanesulfonic acids, alkali metal salts thereof, and combinations thereof (e.g., where the first anionic monomer can be present in an amount less than about 3 mol. % of total PVOH polymers and PVOH copolymers in the film). In another refinement, the second anionic monomer, when present, is selected from the group consisting of monomethyl maleate, alkali metal salts thereof, and combinations thereof. In another refinement, the water-soluble film has a residue value of about 48 wt. % or less as measured by the Dissolution Chamber Test (e.g., about 10 wt. %, 20 wt. %, 30 wt. %, or 35 wt. % to about 40 wt. %, 45 wt. %, or 48 wt. %). In another refinement, the water-soluble film has an average tensile strength value of at least about 33 MPa as measured by the Tensile Strength Test (e.g., about 33 MPa or 35 MPa to about 38 MPa or 50 MPa). In another refinement, the water-soluble film has a modulus value of at least about 12 N/mm$^2$ as measured by the Modulus Test (e.g., about 12 N/mm$^2$ or 12.5 N/mm$^2$ to about 15 N/mm$^2$ or 16 N/mm$^2$)

Another aspect of the disclosure relates to a method of forming the articles described herein, where the method includes the steps of: providing the water-soluble film, where the film defines an interior pouch container volume; filling the container volume with a household care composition; and sealing the film to form a sealed compartment, wherein the sealed compartment contains the composition.

Another aspect of the disclosure relates to a method of treating a substrate, where the method includes the step of contacting the substrate with an article as described herein.

For the compositions and methods described herein, optional features, including but not limited to components, compositional ranges thereof, substituents, conditions, and steps, are contemplated to be selected from the various aspects, embodiments, and examples provided herein.

Further aspects and advantages will be apparent to those of ordinary skill in the art from a review of the following detailed description and accompanying drawings. While the compositions and methods are susceptible of embodiments in various forms, the description hereafter includes specific embodiments with the understanding that the disclosure is illustrative, and is not intended to limit the invention to the specific embodiments described herein.

DESCRIPTION OF THE DRAWINGS

The following detailed description of the various disclosed methods, processes, compositions, and articles refers to the accompanying drawings in which.

DETAILED DESCRIPTION

Figure 1:
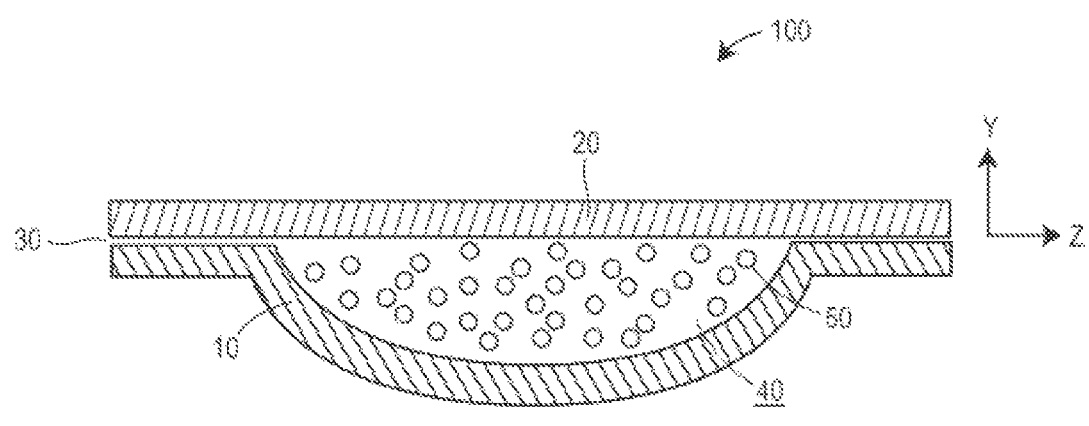
FIG. 1 is a side cross-sectional view of a water-soluble pouch article for the aqueous delivery of a delayed release capsule in combination with another composition according to the disclosure.

Disclosed herein are water-soluble films including blends of polyvinyl alcohol polymers and articles such as delivery pouches formed from or otherwise including the films and household care compositions proximal to the film.

Some water-soluble polymeric films that are used to make articles such as packets that comprise a household care composition and that will incompletely dissolve in water during normal use, for example during a laundry wash cycle for packets containing a laundry-related composition (e.g., thereby leaving film residue on items within the wash).

Water-soluble polymeric films based on PVOH can be subject to changes in solubility characteristics. The acetate group in the co-poly(vinyl acetate vinyl alcohol) polymer is known by those skilled in the art to be hydrolysable by either acid or alkaline hydrolysis. As the degree of hydrolysis increases, a polymer composition made from the PVOH homopolymer resin will have increased mechanical strength but reduced solubility at lower temperatures (e.g., requiring hot water temperatures for complete dissolution). Accordingly, exposure of a PVOH homopolymer resin to an alkaline environment (e.g., resulting from a laundry bleaching additive) can transform the resin from one which dissolves rapidly and entirely in a given aqueous environment (e.g., a cold water medium) to one which dissolves slowly and/or incompletely in the aqueous environment, potentially resulting in undissolved polymeric residue at the end of a wash cycle. This is an inherent weakness in the application of films based on just the vinyl acetate/alcohol co-polymer typified by commercial PVOH homopolymer resins.

PVOH copolymer resins with pendant carboxyl groups, such as vinyl alcohol/hydrolyzed methyl acrylate sodium salt resins, can form lactone rings between neighboring pendant carboxyl and alcohol groups, thus reducing the water solubility of the PVOH copolymer resin. In the presence of a strong base such as a laundry bleaching additive, the lactone rings can open over the course of several weeks at relatively warm (ambient) and high humidity conditions (e.g., via lactone ring-opening reactions to form the corresponding pendant carboxyl and alcohol groups with increased water solubility). Thus, contrary to the effect observed with PVOH homopolymer films, it is believed that such a PVOH copolymer film can become more soluble due to chemical interactions between the film and an alkaline composition inside the pouch during storage. Consequently, as they age, the packets may become increasingly prone to premature dissolution during a hot wash cycle (nominally 40° C.), and may in turn decrease the efficacy of certain laundry actives due to the presence of the bleaching agent and the resulting pH influence.

In formulating a suitable film for a given application (e.g., a composition-in-pouch article for a washing operation), multiple factors must be taken in to account. These factors include: (1) film strength, where a higher strength desirably translates into stronger pouch seals when the film is the weak link in a seal; (2) film modulus, where a higher modulus desirably provides a greater film stiffness and a lower likelihood to deform and stick to other films when loaded on top of each other during production or in final consumer packaging; (3) dissolution residue, where a lower residue value desirably lessens the likelihood of residual film remaining after aggressive washing conditions (e.g., low water (such as in overloading of a washing machine) and cold wash water conditions); and (4) degree of acrylamido methylpropanesulfonic acid (salt) (AMPS) modification, where lower levels of AMPS modification in the polymer desirably reduce the risk of salting out of cleaved amino sulfonate groups when a critical concentration or level of incorporation has been exceeded. Often, water-soluble polymer resins, whether PVOH or otherwise, may have suitable characteristics with respect to some of these factors, but they can have poor characteristics with respect to other of these factors. Accordingly, it would be desirable to provide a water-soluble film in which many, if not all, of these factors have favorable properties in the film.

Accounting for these factors, the present disclosure includes articles comprising a water-soluble film and a household care composition proximal to the film, where the film includes a polyvinyl alcohol (PVOH) resin blend and optionally one or more additional components including plasticizers, fillers, surfactants, and other additives as described in more detail below. The PVOH resin blend includes a first PVOH resin which is a PVOH copolymer ("first PVOH copolymer") including one or more types of anionic monomer units (e.g., a PVOH ter- (or higher co-) polymer) and a second PVOH resin which is a PVOH polymer ("second PVOH polymer"). In some aspects, the second PVOH polymer is also a PVOH copolymer including one or more types of anionic monomer units (e.g., a PVOH ter- (or higher co-) polymer). In other aspects, the second PVOH polymer includes vinyl alcohol monomer units and (optionally) vinyl acetate monomer units (e.g., a PVOH homopolymer which is either completely hydrolyzed polyvinyl alcohol or a partially hydrolyzed combination of poly(vinyl alcohol-co-vinyl acetate). In some aspects, the PVOH resin blend includes only the first PVOH copolymer and the second PVOH polymer or PVOH copolymer (e.g., a binary blend of the two polymers). Alternatively or additionally, the PVOH resin blend, the water-soluble film, or both can be characterized as being free or substantially free from other polymers (e.g., other water-soluble polymers generally, other PVOH-based polymers specifically, or both). In other aspects, the water-soluble film can include one or more additional water-soluble polymers. For example, the PVOH resin blend can include a third PVOH polymer, a fourth PVOH polymer, a fifth PVOH polymer, etc. (e.g., one or more additional PVOH homopolymers or PVOH copolymers, with or without anionic monomer units). For example, the water-soluble film can include at least a third (or fourth, fifth, etc.) water-soluble polymer which is other than a PVOH polymer (e.g., other than PVOH homopolymers or PVOH copolymers, with or without anionic monomer units).

The PVOH copolymer (e.g., the first PVOH copolymer, the second PVOH copolymer when it also is a PVOH anionic copolymer, and any other PVOH copolymers in the resin blend) can be a PVOH terpolymer including vinyl alcohol monomer units, vinyl acetate monomer units (i.e., when not completely hydrolyzed), and a single type of anionic monomer unit (e.g., a where a single type of monomer unit can include equivalent acid forms, salt forms, and optionally ester forms of the anionic monomer unit). In some aspects, the PVOH copolymer can include two or more types of anionic monomer units. General classes of anionic monomer units which can be used for the PVOH copolymer include the vinyl polymerization units corresponding to monocarboxylic acid vinyl monomers, their esters and anhydrides, dicarboxylic monomers having a polymerizable double bond, their esters and anhydrides, vinyl sulfonic acid monomers, and alkali metal salts of any of the foregoing. Examples of suitable anionic monomer units include the vinyl polymerization units corresponding to vinyl anionic monomers including vinyl acetic acid, maleic acid, monoalkyl maleate, dialkyl maleate, monomethyl maleate, dimethyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sufoethyl acrylate, alkali metal salts of the foregoing (e.g., sodium, potassium, or other alkali metal salts), esters of the foregoing (e.g., methyl, ethyl, or other $C_1$-$C_4$ or $C_6$ alkyl esters), and combinations thereof (e.g., multiple types of anionic monomers or equivalent forms of the same anionic monomer). In an aspect, the anionic monomer can be one or more acrylamido methylpropanesulfonic acids (e.g., 2-acrylamido-1-methylpropanesulfonic acid, 2-acrylamido-2-methylpropanesulfonic acid, 2-methylacrylamido-2-methylpropanesulfonic acid), alkali metal salts thereof (e.g., sodium salts), and combinations thereof. In an aspect, the anionic monomer can be one or more of monomethyl maleate, alkali metal salts thereof (e.g., sodium salts), and combinations thereof.

The level of incorporation of the one or more anionic monomer units in the PVOH copolymers (e.g., the first PVOH copolymer, the second PVOH copolymer when it also is a PVOH anionic copolymer) is not particularly limited. In some aspects, the one or more anionic monomer units are present in the PVOH copolymer in an amount in a range of about 1 mol. % or 2 mol. % to about 6 mol. % or 10 mol. % (e.g., at least 1.0, 1.5, 2.0, 2.5, 3.0, 3.5, or 4.0 mol. % and/or up to about 3.0, 4.0, 4.5, 5.0, 6.0, 8.0, or 10 mol. % in various embodiments), individually or collectively. For example, the one or more anionic monomer units can be present in the water-soluble film in an amount in a range of about 1.5 mol % or 2 mol. % to about 3.0 mol. % or 3.5 mol. %, collectively, of total PVOH polymers and PVOH copolymers in the film.

The water-soluble film can contain at least about 50 wt. %, 55 wt. %, 60 wt. %, 65 wt. %, 70 wt. %, 75 wt. %, 80 wt. %, 85 wt. %, or 90 wt. % and/or up to about 60 wt. %, 70 wt. %, 80 wt. %, 90 wt. %, 95 wt. %, or 99 wt. % of the PVOH resin blend. In one aspect, the first PVOH copolymer is present in the water-soluble film in an amount in a range of about 10 wt. % to about 90 wt. % (or about 25 wt. % to about 75 wt. %, about 40 wt. % to about 60 wt. %) of total PVOH polymers and PVOH copolymers in the film (i.e., relative to the PVOH resin blend weight). For example, the first PVOH copolymer can be present in an amount of at least 10 wt. %, 20 wt. %, 30 wt. %, 40 wt. %, 50 wt. %, 60 wt. %, or 70 wt. % and/or up to about 30 wt. %, 40 wt. %, 50 wt. %, 60wt. %, 70 wt. %, 80 wt. % or 90 wt. % of total PVOH polymers and PVOH copolymers in the film. In another aspect, the foregoing concentrations of first PVOH copolymer alternatively or additionally can be relative to total water-soluble polymer content in film, PVOH or otherwise. In an aspect, the second PVOH polymer or PVOH copolymer is present in the water-soluble film in an amount in a range of about 10 wt. % to about 90 wt. % (or about 25 wt. % to about 75 wt. %, about 40 wt. % to about 60 wt. %) of total PVOH polymers and PVOH copolymers in the film (i.e., relative to the PVOH resin blend weight). For example, the second PVOH polymer or PVOH copolymer can be present in an amount of at least 10 wt. %, 20 wt. %, 30 wt. %, 40 wt. %, 50 wt. %, 60 wt. %, or 70 wt. % and/or up to about 30 wt. %, 40 wt. %, 50 wt. %, 60wt. %, 70 wt. %, 80 wt. % or 90 wt. % of total PVOH polymers and PVOH copolymers in the film. In another aspect, the foregoing concentrations of second PVOH polymer or PVOH copolymer alternatively or additionally can be relative to total water-soluble polymer content in film, PVOH or otherwise.

In an aspect of the water-soluble film, the first PVOH copolymer includes one or more first anionic monomer units, and the second PVOH polymer is a PVOH copolymer including one or more second anionic monomer units. The first and second anionic monomer units in the two PVOH copolymers can be the same or different in various embodiments. For reference, the first PVOH copolymer is denoted as having a first level of incorporation ($a_1$) of the first anionic monomer units and the second PVOH copolymer is denoted as having a second level of incorporation ($a_2$) of the second anionic monomer units. In this aspect, the first PVOH copolymer can be present in the water-soluble film in an amount in a range of about 10 wt. % to about 75 wt. % (or about 10 wt. % to about 30 wt. %, about 10 wt. % to about 40 wt. %, about 15 wt. % to about 25 wt. %) of total PVOH polymers and PVOH copolymers in the film (e.g., relative to the PVOH resin blend weight). For example, the first PVOH copolymer can be present in an amount of at least 10 wt. %, 15 wt. %, 20 wt. %, or 30 wt. % and/or up to about 25 wt. %, 40 wt. %, 60 wt. %, or 75 wt. % of total PVOH polymers and PVOH copolymers in the film (e.g., alternatively relative to total water-soluble polymer content in film, PVOH or otherwise). In this aspect, the second PVOH copolymer can be present in the water-soluble film in an amount in a range of about 25 wt. % to about 90 wt. % (or about 70 wt. % to about 90 wt. %, about 60 wt. % to about 90 wt. %, about 75 wt. % to about 85 wt. %) of total PVOH polymers and PVOH copolymers in the film (e.g., relative to the PVOH resin blend weight). For example, the second PVOH copolymer can be present in an amount of at least 25 wt. %, 40 wt. %, 60 wt. %, 70 wt. %, or 75 wt. % and/or up to about 70 wt. %, 80 wt. %, 85 wt. %, or 90 wt. % of total PVOH polymers and PVOH copolymers in the film (e.g., alternatively relative to total water-soluble polymer content in film, PVOH or otherwise).

In a refinement of this aspect, the first anionic monomer unit can be one or more monomer units from acrylamido methylpropanesulfonic acids (e.g., AMPS comonomers such as 2-acrylamido-1-methylpropanesulfonic acid, 2-acrylamido-2-methylpropanesulfonic acid, 2-methylacrylamido-2-methylpropanesulfonic acid), alkali metal salts thereof (e.g., sodium salts), and combinations thereof. In this refinement, the one or more first anionic monomer units can be present in an amount less than about 3 mol. %, individually or collectively, of total PVOH polymers and PVOH copolymers in the film (e.g., at least 0.2, 0.4, 0.6, 0.8 or 1.0 mol. % and/or less than 1.6, 1.8, 2.0, 2.5, or 3 mol. % of the one or more first anionic monomer units, individually or collectively). In an embodiment, the film can be free from acrylamido methylpropanesulfonic acid comonomer units (e.g., first and second anionic monomers and corresponding monomer units are other than AMPS). In a further refinement, the second anionic monomer unit can be one or more monomer units from monomethyl maleate, alkali metal salts thereof (e.g., sodium salts), and combinations thereof.

In a refinement of this aspect, the first and second PVOH copolymers are selected such that the difference $a_1-a_2$ is greater than zero for the relative anionic monomer content of the first and second PVOH copolymers (i.e., the first PVOH copolymer has a higher molar level of anionic monomer incorporation than the second PVOH copolymer). For example, the difference $a_1-a_2$ can be in a range of about 0.5 mol. % to about 10 mol. % (or about 1 mol. % to about 3 mol. %, or about 1.5 mol. % to about 2.5 mol. %), and it more generally can be at least 0.5, 1, or 2 mol. % and/or up to about 1, 2, 3, 4, 5, or 10 mol. %. Individually, the level of incorporation ($a_1$) for the first anionic monomer units can be in a range of about 2 mol. % to about 6 mol. % (or about 3 mol. % to about 5 mol. %, about 3 mol. % to about 4 mol. %) in the first PVOH copolymer. Alternatively or additionally, the level of incorporation ($a_2$) for the second anionic monomer units can be in a range of about 0.5 mol. % to about 4 mol. % (or about 1 mol. % to about 3 mol. %, or about 1 mol. % to about 2 mol. %) in the second PVOH copolymer.

If the first and second anionic monomer units are the same in a particular embodiment, the resulting PVOH resin blend (and the corresponding film) can be characterized as having at least a bimodal (e.g., bimodal, trimodal, or higher polymodal) distribution of anionic monomer unit incorporation levels in individual polymer chains. For example, a first PVOH copolymer having a first level of incorporation $a_1$ in the bulk polymer has a distribution of incorporation levels around $a_1$ for individual polymer chains of the first PVOH copolymer. Likewise, a second PVOH copolymer having a second level of incorporation $a_2$ in the bulk polymer has a distribution of incorporation levels around $a_2$ for individual polymer chains of the second PVOH copolymer. In this case, the difference $a_1-a_2$ is selected to be sufficiently large such that there are at least two peaks in the anionic monomer unit distribution for the blend (e.g., a valley present between two adjacent distribution peaks is less than about 90%, 85%, 80%, 75%, 50%, 25%, or 10% in height relative to the adjacent distribution peaks).

In another refinement of this aspect, the water-soluble film of the disclosed articles articles can be characterized in terms of the total molar content of the first and second anionic monomer units in the film (in particular relative to the polymeric resin content thereof). In one aspect, the first anionic monomer units and the second anionic monomer units are present in the film in a combined amount in a range from about 2.0 mol. % to about 3.5 mol. % (or about 2.0 mol. % to about 2.8 mol. %, or about 2.0 mol. % to about 2.6 mol. %) of total PVOH polymers and PVOH copolymers in the film. For example, the first anionic monomer units and the second anionic monomer units can be present in the film in an amount of at least 2.0, 2.2 or 2.4 mol. % and/or up to 2.8, 3.0, or 3.5 mol. %, collectively. The combined anionic monomer unit content alternatively or additionally can be expressed relative to total water-soluble polymer content in the film, PVOH or otherwise.

In another aspect of the water-soluble film of the disclosed articles, the first PVOH copolymer and the second PVOH polymer are selected for the PVOH resin blend such that the resulting water-soluble film has improved dissolution properties and preferably improved physical/mechanical properties as well. In particular, the water-soluble film has the property in which (a) the water-soluble film has a residue value of about 48 wt. % or less (e.g., in a range of about 12 wt. % to about 48 wt. % or about 35 wt. % to about 48 wt. %) as measured by the Dissolution Chamber Test (described below). In some embodiments, the water-soluble film has the property in which (b) the water-soluble film has an average tensile strength value of at least about 33 MPa (e.g., in a range of about 33 MPa to about 38 MPa) as measured by the Tensile Strength Test (described below). In some embodiments, the water-soluble film has the property in which (c) the water-soluble film has a modulus value of at least about 12 N/mm$^2$ (e.g., in a range of about 12.5 N/mm$^2$ to about 15 N/mm$^2$) as measured by the Modulus Test (described below). In various embodiments, the water-soluble film has the properties (a) and (b), (a) and (c), or (a) and (b) and (c). In any of the foregoing embodiments, the water-soluble film additionally can have a Residue-AMPS Factor (RAF; described below) value in a range of about 54 to about 100 (e.g., about 85 to about 98, about 92 to about 98).

The PVOH resin blends according to the disclosure unexpectedly permit the formulation of water-soluble films having a combination of desirable physical and chemical properties, even when the PVOH polymers or PVOH copolymers included in the resin blends are deficient individually with respect to one or more of physical or chemical properties. For example, each PVOH polymer and PVOH copolymer in the blend has at least one undesirable trait for a particular property, but the water-soluble film incorporating the blend achieves a desirable trait for the particular property of each PVOH polymer and PVOH copolymer. For example, the PVOH resin blend can include first and second PVOH polymers or PVOH copolymers such that a corresponding first PVOH copolymer water-soluble film has the property (a) and a corresponding second PVOH polymer water-soluble film does not have the property (a). Alternatively or additionally, the PVOH resin blend can include first and second PVOH polymers or PVOH copolymers such that a corresponding first PVOH copolymer water-soluble film does not have the property (b); and a corresponding second PVOH polymer water-soluble film has the property (b). Alternatively or additionally, the PVOH resin blend can include first and second PVOH polymers or PVOH copolymers such that a corresponding first PVOH copolymer water-soluble film does not have the property (c); and a corresponding second PVOH polymer water-soluble film has the property (c). A corresponding PVOH polymer denotes a water-soluble film containing only the first PVOH copolymer or the second PVOH polymer as the water-soluble polymer resin, but otherwise including the same type and amounts of plasticizers and other additives, having the same thickness, etc.

In this aspect, the anionic monomer units for the first PVOH copolymer and second PVOH polymer or PVOH copolymer (when an anionic PVOH copolymer) generally can be any combination of those described above. In a refinement, the first anionic monomer unit can be one or more monomer units from acrylamido methylpropanesulfonic acids (e.g., AMPS comonomers such as 2-acrylamido-1-methylpropanesulfonic acid, 2-acrylamido-2-methylpropanesulfonic acid, 2-methylacrylamido-2-methylpropanesulfonic acid), alkali metal salts thereof (e.g., sodium salts), and combinations thereof. In this refinement, the one or more first anionic monomer units can be present in an amount less than about 3 mol. %, individually or collectively, of total PVOH polymers and PVOH copolymers in the film (e.g., at least 0.2, 0.4, 0.6, 0.8 or 1.0 mol. % and/or less than 1.6, 1.8, 2.0, 2.5, or 3 mol. % of the one or more first acrylamido methylpropanesulfonic acid monomer units, individually or collectively). In a further refinement, the second PVOH polymer is an anionic PVOH copolymer, the second anionic monomer unit can be one or more monomer units from monomethyl maleate, alkali metal salts thereof (e.g., sodium salts), and combinations thereof. In this refinement, the first PVOH copolymer can be present in the water-soluble film in an amount in a range of about 10 wt. % to about 75 wt. % (or about 10 wt. % to about 30 wt. %, or about 10 wt. % to about 40 wt. %, or about 15 wt. % to about 25 wt. %) and the second PVOH copolymer can be present in the water-soluble film in an amount in a range of about 25 wt. % to about 90 wt. % (or about 70 wt. % to about 90 wt. %, or about 60 wt. % to about 90 wt. %, or about 75 wt. % to about 85 wt. %) of total PVOH polymers and PVOH copolymers in the film. In an alternative refinement, the second PVOH polymer is a partially or completely hydrolyzed PVOH homopolymer. In this refinement, the first PVOH copolymer can be present in the water-soluble film in an amount in a range of about 30 wt. % to about 70 wt. % (or about 40 wt. % to about 60 wt. %) and the second PVOH homopolymer can be present in the water-soluble film in an amount in a range of about 30 wt. % to about 70 wt. % (or about 40 wt. % to about 60 wt. %) of total PVOH polymers and PVOH copolymers in the film. Further, the first PVOH copolymer and the second PVOH polymer can have 4% solution viscosity values at 20° C. that are within about 10 cP of each other (e.g., within about 3 cP, or within about 6 cP). Alternatively, the first PVOH copolymer and the second PVOH polymer can have 4% solution viscosity values at 20° C. that are more than about 10 cP apart from each other (e.g., about 10 cP to about 16 cP apart, or about 10 cP to about 20 cP apart).

In an aspect of the water-soluble film of the disclosed articles, the first PVOH copolymer includes one or more first anionic monomer units, and the second PVOH polymer is a partially or completely hydrolyzed PVOH homopolymer. In this aspect, the first PVOH copolymer can be present in the water-soluble film in an amount in a range of about 30 wt. % to about 70 wt. % (or about 40 wt. % to about 60 wt. %, or about 45 wt. % to about 55 wt. %) of total PVOH polymers and PVOH copolymers in the film, for example being present in an amount of at least 30 wt. %, 40 wt. %, or 45 wt. % and/or up to about 55 wt. %, 60 wt. %, or 70 wt. %. The second PVOH homopolymer can be present in the water-soluble film in an amount in a range of about 30 wt. % to about 70 wt. % (or about 40 wt. % to about 60 wt. %, or about 45 wt. % to about 55 wt. %) of total PVOH polymers and PVOH copolymers in the film, for example being present in an amount of at least 30 wt. %, 40 wt. %, or 45 wt. % and/or up to about 55 wt. %, 60 wt. %, or 70 wt. %. Further, the first PVOH copolymer and the second PVOH homopolymer can have 4% solution viscosity values at 20° C. that are within about 10 cP of each other (e.g., within about 3 cP, or within about 6 cP). Alternatively, the first PVOH copolymer and the second PVOH homopolymer can have 4% solution viscosity values at 20° C. that are more than about 10 cP apart from each other (e.g., about 10 cP to about 16 cP apart, or about 10 cP to about 20 cP apart).

In this aspect, the anionic monomer units for the first PVOH copolymer generally can be any of those described above. The level of incorporation for the one or more first anionic monomer units in the first PVOH copolymer can be in a range of about 2 mol. % to about 6 mol. % (or about 3 mol. % to about 5 mol. %, or about 3 mol. % to about 4 mol. %), individually or collectively, in the first PVOH copolymer. Alternatively or additionally, the one or more first anionic monomer units can be present in the film in an amount in a range from about 1.0 mol. % to about 3.0 mol. % (or about 1.4 mol. % to about 2.6 mol. %, or about 1.6 mol. % to about 2.2 mol. %), collectively, of total PVOH polymers and PVOH copolymers in the film. In a refinement, the first anionic monomer units can be one or more monomer units selected from acrylamido methylpropanesulfonic acids (e.g., AMPS comonomers such as 2-acrylamido-1-methylpropanesulfonic acid, 2-acrylamido-2-methylpropanesulfonic acid, 2-methylacrylamido-2-methylpropanesulfonic acid), alkali metal salts thereof (e.g., sodium salts), and combinations thereof. In this refinement, the first anionic monomer units can be present in an amount less than about 3 mol. %, collectively, of total PVOH polymers and PVOH copolymers in the film (e.g., at least 0.2, 0.4, 0.6, 0.8 or 1.0 mol. % and/or less than 1.6, 1.8, 2.0, 2.5, or 3 mol. % of the first acrylamido methylpropanesulfonic acid monomer units, collectively).

As described in more detail below, PVOH polymer and PVOH copolymer resins can be characterized in terms of their 4% solution viscosity values at 20° C. in water (i.e., as values which generally correlate to the molecular weights of the resins). For reference, the first PVOH copolymer is denoted as having a first 4% solution viscosity at 20° C. ($\mu_1$), and the second PVOH polymer or PVOH copolymer is denoted as having a second 4% solution viscosity at 20° C. ($\mu_2$). In various embodiments, the first viscosity $\mu_1$ can be in a range of about 4 cP to about 30 cP (e.g., at least about 4, 8, 10, 12, or 16 cP and/or up to about 12, 16, 20, 24, or 30 cP, such as about 10 cP to about 16 cP, or about 10 cP to about 20 cP, or about 20 cP to about 30 cP). Alternatively or additionally, the second viscosity $\mu_2$ can be in a range of about 4 cP to about 30 cP (e.g., at least about 4, 8, 10, 12, or 16 cP and/or up to about 12, 16, 20, 24, or 30 cP, such as about 10 cP to about 16 cP, or about 10 cP to about 20 cP, or about 20 cP to about 30 cP). When the PVOH resin blend includes three or more PVOH resins selected from PVOH polymer and PVOH copolymer resins, the foregoing viscosity values can apply to each PVOH polymer or PVOH copolymer individually.

The disclosed water-soluble films, articles such as delivery pouches including the films, and related methods are contemplated to include embodiments including any combination of one or more of the additional optional elements, features, and steps further described below (including those shown in the figures and examples), unless stated otherwise.

In any embodiment, the articles such as a water-soluble pouch can include a composition. The composition is typically a household care composition. The composition can be selected from a liquid, solid or combination thereof. As used herein, "liquid" includes free-flowing liquids, as well as pastes, gels, foams and mousses. Non-limiting examples of liquids include light duty and heavy duty liquid detergent compositions, fabric enhancers, detergent gels commonly used for laundry, bleach and laundry additives. Gases, e.g., suspended bubbles, or solids, e.g. particles, may be included within the liquids. A "solid" as used herein includes, but is not limited to, powders, agglomerates, and mixtures thereof. Non-limiting examples of solids include: granules, microcapsules, beads, noodles, and pearlised balls. Solid compositions may provide a technical benefit including, but not limited to, through-the-wash benefits, pre-treatment benefits, and/or aesthetic effects.

In any of the laundry-centric embodiments, the composition may be selected from the group of liquid light duty and liquid heavy duty liquid detergent compositions, powdered detergent compositions, fabric enhancers, detergent gels commonly used for laundry, and bleach (e.g., organic or inorganic bleach) and laundry additives, for example.

As used herein, the term "homopolymer" generally includes polymers having a single type of monomeric repeating unit (e.g., a polymeric chain consisting of or consisting essentially of a single monomeric repeating unit). For the particular case of PVOH, the term "homopolymer" (or "PVOH homopolymer" or "PVOH polymer") further includes copolymers having a distribution of vinyl alcohol monomer units and vinyl acetate monomer units, depending on the degree of hydrolysis (e.g., a polymeric chain consisting of or consisting essentially of vinyl alcohol and vinyl acetate monomer units). In the limiting case of 100% hydrolysis, a PVOH homopolymer can include a true homopolymer having only vinyl alcohol units.

As used herein, the term "copolymer" generally includes polymers having two or more types of monomeric repeating units (e.g., a polymeric chain consisting of or consisting essentially of two or more different monomeric repeating units, whether as random copolymers, block copolymers, etc.). For the particular case of PVOH, the term "copolymer" (or "PVOH copolymer") further includes copolymers having a distribution of vinyl alcohol monomer units and vinyl acetate monomer units, depending on the degree of hydrolysis, as well as at least one other type of monomeric repeating unit (e.g., a ter- (or higher) polymeric chain consisting of or consisting essentially of vinyl alcohol monomer units, vinyl acetate monomer units, and one or more other monomer units, for example anionic monomer units). In the limiting case of 100% hydrolysis, a PVOH copolymer can include a copolymer having vinyl alcohol units and one or more other monomer units, but no vinyl acetate units.

As used herein, the term "comprising" indicates the potential inclusion of other agents, elements, steps, or features, in addition to those specified.

As used herein and unless specified otherwise, the terms "wt. %" and "wt %" are intended to refer to the composition of the identified element in "dry" (non water) parts by weight of the entire film (when applicable) or parts by weight of the entire composition enclosed within a pouch (when applicable). As used herein and unless specified otherwise, the term "phr" is intended to refer to the composition of the identified element in parts per one hundred parts water-soluble polymer (or resin; whether PVOH or otherwise) in the water-soluble film.

All ranges set forth herein include all possible subsets of ranges and any combinations of such subset ranges. By default, ranges are inclusive of the stated endpoints, unless stated otherwise. Where a range of values is provided, it is understood that each intervening value between the upper and lower limit of that range and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also contemplated to be part of the disclosure.

Water-Soluble Film Compositions

Water-soluble film compositions, optional ingredients for use therein, and methods of making the same are well known in the art, whether being used for making relatively thin water-soluble films (e.g., as pouch materials) or otherwise.

In one class of embodiments, the water-soluble film includes polyvinyl alcohol (PVOH), including homopolymers thereof (e.g., including substantially only vinyl alcohol and vinyl acetate monomer units) and copolymers thereof (e.g., including one or more other monomer units in addition to vinyl alcohol and vinyl acetate units). PVOH is a synthetic resin generally prepared by the alcoholysis, usually termed hydrolysis or saponification, of polyvinyl acetate. Fully hydrolyzed PVOH, wherein virtually all the acetate groups have been converted to alcohol groups, is a strongly hydrogen-bonded, highly crystalline polymer which dissolves only in hot water—greater than about 140° F. (60° C.). If a sufficient number of acetate groups are allowed to remain after the hydrolysis of polyvinyl acetate, the PVOH polymer then being known as partially hydrolyzed, it is more weakly hydrogen-bonded and less crystalline and is soluble in cold water—less than about 50° F. (10° C.). An intermediate cold or hot water soluble film can include, for example, intermediate partially-hydrolyzed PVOH (e.g., with degrees of hydrolysis of about 94% to about 98%), and is readily soluble only in warm water—e.g., rapid dissolution at temperatures of about 40° C. and greater. Both fully and partially hydrolyzed PVOH types are commonly referred to as PVOH homopolymers although the partially hydrolyzed type is technically a vinyl alcohol-vinyl acetate copolymer.

The degree of hydrolysis (DH) of the PVOH polymers and PVOH copolymers included in the water-soluble films of the present disclosure can be in a range of about 75% to about 99% (e.g., about 79% to about 92%, about 86.5% to about 89%, or about 88%, such as for cold-water soluble compositions; about 90% to about 99%, about 92% to about 99%, or about 95% to about 99%). As the degree of hydrolysis is reduced, a film made from the resin will have reduced mechanical strength but faster solubility at temperatures below about 20° C. As the degree of hydrolysis increases, a film made from the polymer will tend to be mechanically stronger and the thermoformability will tend to decrease. The degree of hydrolysis of the PVOH can be chosen such that the water-solubility of the polymer is temperature dependent, and thus the solubility of a film made from the polymer, any compatibilizer polymer, and additional ingredients is also influenced. In one option the film is cold water-soluble. A cold water-soluble film, soluble in water at a temperature of less than 10° C., can include PVOH with a degree of hydrolysis in a range of about 75% to about 90%, or in a range of about 80% to about 90%, or in a range of about 85% to about 90%. In another option the film is hot water-soluble. A hot water-soluble film, soluble in water at a temperature of at least about 60° C., can include PVOH with a degree of hydrolysis of at least about 98%.

Other water soluble polymers for use in addition to the PVOH polymers and PVOH copolymers in the blend can include, but are not limited to modified polyvinyl alcohols, polyacrylates, water-soluble acrylate copolymers, polyvinyl pyrrolidone, polyethyleneimine, pullulan, water-soluble natural polymers including, but not limited to, guar gum, gum Acacia, xanthan gum, carrageenan, and starch, water-soluble polymer derivatives including, but not limited to, modified starches, ethoxylated starch, and hydroxypropylated starch, copolymers of the forgoing and combinations of any of the foregoing. Yet other water-soluble polymers can include polyalkylene oxides, polyacrylamides, polyacrylic acids and salts thereof, celluloses, cellulose ethers, cellulose esters, cellulose amides, polyvinyl acetates, polycarboxylic acids and salts thereof, polyaminoacids, polyamides, gelatines, methylcelluloses, carboxymethylcelluloses and salts thereof, dextrins, ethylcelluloses, hydroxyethyl celluloses, hydroxypropyl methylcelluloses, maltodextrins, and polymethacrylates. Such water-soluble polymers, whether PVOH or otherwise are commercially available from a variety of sources. Any of the foregoing water-soluble polymers are generally suitable for use as film-forming polymers. In general, the water-soluble film can include copolymers and/or blends of the foregoing resins.

The water-soluble polymers (e.g., the PVOH resin blend alone or in combination with other water-soluble polymers) can be included in the film in an amount in a range of about 30 wt. % or 50 wt. % to about 90 wt. % or 95 wt. %, for example. The weight ratio of the amount of all water-soluble polymers as compared to the combined amount of all plasticizers, compatibilizing agents, and secondary additives can be in a range of about 0.5 to about 18, about 0.5 to about 15, about 0.5 to about 9, about 0.5 to about 5, about 1 to 3, or about 1 to 2, for example. The specific amounts of plasticizers and other non-polymer component can be selected in a particular embodiment based on an intended application of the water-soluble film to adjust film flexibility and to impart processing benefits in view of desired mechanical film properties.

Water-soluble polymers for use in the film described herein (including, but not limited to PVOH polymers and PVOH copolymers) can be characterized by a viscosity in a range of about 3.0 to about 27.0 cP, about 4.0 to about 24.0 cP, about 4.0 to about 23.0 cP, about 4.0 cP to about 15 cP, or about 6.0 to about 10.0 cP, for example. The viscosity of a polymer is determined by measuring a freshly made solution using a Brookfield LV type viscometer with UL adapter as described in British Standard EN ISO 15023-2: 2006 Annex E Brookfield Test method. It is international practice to state the viscosity of 4% aqueous polyvinyl alcohol solutions at 20° C. Polymeric viscosities specified herein in cP should be understood to refer to the viscosity of a 4% aqueous water-soluble polymer solution at 20° C., unless specified otherwise.

It is well known in the art that the viscosity of a water-soluble polymer (PVOH or otherwise) is correlated with the weight-average molecular weight ($\overline{M}_W$) of the same polymer, and often the viscosity is used as a proxy for $\overline{M}_W$. Thus, the weight-average molecular weight of the water-soluble polymers, including the first PVOH copolymer and the second PVOH polymer or second PVOH copolymer, can be in a range of about 30,000 to about 175,000, or about 30,000 to about 100,000, or about 55,000 to about 80,000, for example.

The water-soluble film can contain other auxiliary agents and processing agents, such as, but not limited to, plasticizers, plasticizer compatibilizers, surfactants, lubricants, release agents, fillers, extenders, cross-linking agents, antiblocking agents, antioxidants, detackifying agents, antifoams, nanoparticles such as layered silicate-type nanoclays (e.g., sodium montmorillonite), bleaching agents (e.g., sodium metabisulfite, sodium bisulfite or others), aversive agents such as bitterants (e.g., denatonium salts such as denatonium benzoate, denatonium saccharide, and denatonium chloride; sucrose octaacetate; quinine; flavonoids such as quercetin and naringen; and quassinoids such as quassin and brucine) and pungents (e.g., capsaicin, piperine, allyl isothiocyanate, and resinferatoxin), and other functional ingredients, in amounts suitable for their intended purposes. Embodiments including plasticizers are preferred. The amount of such agents can be up to about 50 wt. %, 20 wt %, 15 wt %, 10 wt %, 5 wt. %, 4 wt % and/or at least 0.01 wt. %, 0.1 wt %, 1 wt %, or 5 wt %, individually or collectively.

The plasticizer can include, but is not limited to, glycerin, diglycerin, sorbitol, ethylene glycol, diethylene glycol, triethylene glycol, dipropylene glycol, tetraethylene glycol, propylene glycol, polyethylene glycols up to 400 MW, neopentyl glycol, trimethylolpropane, polyether polyols, sorbitol, 2-methyl-1,3-propanediol, ethanolamines, and a mixture thereof. A preferred plasticizer is glycerin, sorbitol, triethyleneglycol, propylene glycol, dipropylene glycol, 2-methyl-1,3-propanediol, trimethylolpropane, or a combination thereof. The total amount of the plasticizer can be in a range of about 10 wt. % to about 40 wt. %, or about 15 wt. % to about 35 wt. %, or about 20 wt. % to about 30 wt. %, for example about 25 wt. %, based on total film weight. Combinations of glycerin, dipropylene glycol, and sorbitol can be used. Optionally, glycerin can be used in an amount of about 5 wt % to about 30 wt %, or 5 wt % to about 20 wt %, e.g., about 13 wt %. Optionally, dipropylene glycol can be used in an amount of about 1 wt. % to about 20 wt. %, or about 3 wt. % to about 10 wt. %, for example 6 wt. %. Optionally, sorbitol can be used in an amount of about 1 wt % to about 20 wt %, or about 2 wt % to about 10 wt %, e.g., about 5 wt %. The specific amounts of plasticizers can be selected in a particular embodiment based on desired film flexibility and processability features of the water-soluble film. At low plasticizer levels, films may become brittle, difficult to process, or prone to breaking. At elevated plasticizer levels, films may be too soft, weak, or difficult to process for a desired use.

Suitable surfactants can include the nonionic, cationic, anionic and zwitterionic classes. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof. In various embodiments, the amount of surfactant in the water-soluble film is in a range of about 0.1 wt % to 2.5 wt %, optionally about 1.0 wt % to 2.0 wt %.

Suitable lubricants/release agents can include, but are not limited to, fatty acids and their salts, fatty alcohols, fatty esters, fatty amines, fatty amine acetates and fatty amides. Preferred lubricants/release agents are fatty acids, fatty acid salts, and fatty amine acetates. In one type of embodiment, the amount of lubricant/release agent in the water-soluble film is in a range of about 0.02 wt % to about 1.5 wt %, optionally about 0.1 wt % to about 1 wt %.

Suitable fillers/extenders/antiblocking agents/detackifying agents include, but are not limited to, starches, modified starches, crosslinked polyvinylpyrrolidone, crosslinked cellulose, microcrystalline cellulose, silica, metallic oxides, calcium carbonate, talc and mica. Preferred materials are starches, modified starches and silica. In one type of embodiment, the amount of filler/extender/antiblocking agent/detackifying agent in the water-soluble film is in a range of about 0.1 wt % to about 25 wt %, or about 1 wt % to about 10 wt %, or about 2 wt. % to about 8 wt. %, or about 3 wt. % to about 5 wt. %. In the absence of starch, one preferred range for a suitable filler/extender/antiblocking agent/detackifying agent is about 0.1 wt % or 1 wt % to about 4 wt % or 6 wt %, or about 1 wt. % to about 4 wt. %, or about 1 wt. % to about 2.5 wt. %.

The water-soluble film can further have a residual moisture content of at least 4 wt. %, for example in a range of about 4 to about 10 wt. %, as measured by Karl Fischer titration.

Other features of water-soluble polymer compositions such as films, may be found in U.S. Publication No. 2011/0189413 and U.S. Publication No. 2014/0199460, both of which are incorporated by reference herein in their entireties.

Method of Making Film

One contemplated class of embodiments is characterized by the water-soluble film being formed by, for example, admixing, co-casting, or welding the first PVOH copolymer and the second PVOH polymer according to the types and amounts described herein, together with the preferred and optional secondary additives described herein. If the polymers are first admixed then the water-soluble film is preferably formed by casting the resulting admixture (e.g., along with other plasticizers and other additives) to form a film. If the polymers are welded, the water-soluble film can be formed by, for example, solvent or thermal welding. Another contemplated class of embodiments is characterized by the water-soluble film being formed by extrusion, for example, blown extrusion. In one contemplated non-limiting embodiment a PVOH polymer and an acrylamido methylpropanesulfonic acid PVOH terpolymer blended film is formed by blown extrusion.

The film can have any suitable thickness. For example, the film can have a thickness in a range of about 5 to about 200 μm, or in a range of about 20 to about 100 μm, or about 40 to about 85 μm, for example 76 μm.

Optionally, the water-soluble film can be a free-standing film consisting of one layer or a plurality of like layers.

The film is useful for creating an article such as an article such as packet to contain a detergent composition comprising cleaning actives thereby forming a pouch. The cleaning actives may take any form such as powders, gels, pastes, liquids, tablets or any combination thereof. The film is also useful for any other application in which improved wet handling and low cold water residues are desired. The film forms at least one side wall of the pouch and/or packet, optionally the entire pouch and/or packet, and preferably an outer surface of the at least one sidewall.

The film described herein can also be used to make an article such as a packet with two or more compartments made of the same film or in combination with films of other polymeric materials. Additional films can, for example, be obtained by casting, blow-molding, extrusion or blown extrusion of the same or a different polymeric material, as known in the art. In one type of embodiment, the polymers, copolymers or derivatives thereof suitable for use as the additional film are selected from polyvinyl alcohols, polyvinyl pyrrolidone, polyalkylene oxides, polyacrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatin, natural gums such as xanthan, and carrageenans. For example, polymers can be selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and combinations thereof, or selected from polyvinyl alcohols, polyvinyl alcohol copolymers and hydroxypropyl methyl cellulose (HPMC), and combinations thereof. One contemplated class of embodiments is characterized by the level of polymer in the packet material, for example the PVOH resin blend, as described above, being at least 60%.

Articles

The articles of the present disclosure include water soluble film and a composition, typically a household care composition, that is proximal to the film.

The articles of the present disclosure can include pouches that may include at least one sealed compartment. Thus, the pouches may comprise a single compartment or multiple compartments. FIG. 1 illustrates an article in which a water-soluble pouch 100 is formed from water-soluble polymer films 10, 20 sealed at an interface 30. One or both of the films 10, 20 include the PVOH resin blend of the first PVOH copolymer and the second PVOH polymer. The films 10, 20 define an interior pouch container volume 40 which contains any desired composition 50 for release into an aqueous environment. The composition 50 is not particularly limited, for example including any of the variety of cleaning compositions described below. In embodiments comprising multiple compartments (not shown), each compartment may contain identical and/or different compositions. In turn, the compositions may take any suitable form including, but not limited to liquid, solid and combinations thereof (e.g. a solid suspended in a liquid). In some embodiments, the pouches comprises a first, second and third compartment, each of which respectively contains a different first, second, and third composition.

The compartments of multi-compartment pouches may be of the same or different size(s) and/or volume(s). The compartments of the present multi-compartment pouches can be separate or conjoined in any suitable manner. In some embodiments, the second and/or third and/or subsequent compartments are superimposed on the first compartment. In one embodiment, the third compartment may be superimposed on the second compartment, which is in turn superimposed on the first compartment in a sandwich configuration. Alternatively the second and third compartments may be superimposed on the first compartment. However it is also equally envisaged that the first, second and optionally third and subsequent compartments may be attached to one another in a side by side relationship. The compartments may be packed in a string, each compartment being individually separable by a perforation line. Hence each compartment may be individually torn-off from the remainder of the string by the end-user, for example, so as to pre-treat or post-treat a fabric with a composition from a compartment. In some embodiments, the first compartment may be surrounded by at least the second compartment, for example in a tire-and-rim configuration.

In some embodiments, multi-compartment pouches comprise three compartments consisting of a large first compartment and two smaller compartments. The second and third smaller compartments are superimposed on the first larger compartment. The size and geometry of the compartments are chosen such that this arrangement is achievable. The geometry of the compartments may be the same or different. In some embodiments the second and optionally third compartment each has a different geometry and shape as compared to the first compartment. In these embodiments, the second and optionally third compartments are arranged in a design on the first compartment. The design may be decorative, educative, or illustrative, for example to illustrate a concept or instruction, and/or used to indicate origin of the product. In some embodiments, the first compartment is the largest compartment having two large faces sealed around the perimeter, and the second compartment is smaller covering less than about 75%, or less than about 50% of the surface area of one face of the first compartment. In embodiments in which there is a third compartment, the aforementioned structure may be the same but the second and third compartments cover less than about 60%, or less than about 50%, or less than about 45% of the surface area of one face of the first compartment.

The articles, pouches and/or packets of the present disclosure may comprise one or more different films. For example, in single compartment embodiments, the packet may be made from one wall that is folded onto itself and sealed at the edges, or alternatively, two walls that are sealed together at the edges. In multiple compartment embodiments, the packet may be made from one or more films such that any given packet compartment may comprise walls made from a single film or multiple films having differing compositions. In one embodiment, a multi-compartment pouch comprises at least three walls: an outer upper wall; an outer lower wall; and a partitioning wall. The outer upper wall and the outer lower wall are generally opposing and form the exterior of the pouch. The partitioning wall is interior to the pouch and is secured to the generally opposing outer walls along a seal line. The partitioning wall separates the interior of the multi-compartment pouch into at least a first compartment and a second compartment.

Pouches and packets may be made using any suitable equipment and method. For example, single compartment pouches may be made using vertical form filling, horizontal form filling, or rotary drum filling techniques commonly known in the art. Such processes may be either continuous or intermittent. The film may be dampened, and/or heated to increase the malleability thereof. The method may also involve the use of a vacuum to draw the film into a suitable mold. The vacuum drawing the film into the mold can be applied for about 0.2 to about 5 seconds, or about 0.3 to about 3, or about 0.5 to about 1.5 seconds, once the film is on the horizontal portion of the surface. This vacuum can be such that it provides an under-pressure in a range of 10 mbar to 1000 mbar, or in a range of 100 mbar to 600 mbar, for example.

The molds, in which packets may be made, can have any shape, length, width and depth, depending on the required dimensions of the pouches. The molds may also vary in size and shape from one to another, if desirable. For example, the volume of the final pouches may be about 5 ml to about 300 ml, or about 10 to 150 ml, or about 20 to about 100 ml, and that the mold sizes are adjusted accordingly.

The packet may comprise a first and a second sealed compartment. The second compartment is in a generally superposed relationship with the first sealed compartment such that the second sealed compartment and the first sealed compartment share a partitioning wall interior to the pouch.

The packet comprising a first and a second compartment may further comprise a third sealed compartment. The third sealed compartment is in a generally superposed relationship with the first sealed compartment such that the third sealed compartment and the first sealed compartment share a partitioning wall interior to the pouch.

The first composition and the second composition may be selected from one of the following combinations: liquid, liquid; liquid, powder; powder, powder; and powder, liquid.

The first, second and third compositions may be selected from one of the following combinations: solid, liquid, liquid and liquid, liquid, liquid.

The single compartment or plurality of sealed compartments may contain a composition. The plurality of compartments may each contain the same or a different composition. The composition is selected from a liquid, solid or combination thereof.

The household care composition may be selected from the group of liquid light duty and liquid heavy duty liquid detergent compositions, powdered detergent compositions, dish detergent for hand washing and/or machine washing; hard surface cleaning compositions, fabric enhancers, detergent gels commonly used for laundry, and bleach and laundry additives, shampoos, and body washes.

Shaping, Sealing, and Thermoforming

A contemplated class of embodiments is characterized by good thermoformability of the water-soluble film made as described herein. A thermoformable film is one that can be shaped through the application of heat and a force.

Thermoforming a film is the process of heating the film, shaping it in a mold, and then allowing the film to cool, whereupon the film will hold the shape of the mold. The heat may be applied using any suitable means. For example, the film may be heated directly by passing it under a heating element or through hot air, prior to feeding it onto a surface or once on a surface. Alternatively, it may be heated indirectly, for example by heating the surface or applying a hot item onto the film. In some embodiments, the film is heated using an infrared light. The film may be heated to a temperature of about 50 to about 150° C., about 50 to about 120° C., about 60 to about 130° C., about 70 to about 120° C., or about 60 to about 90° C. Thermoforming can be performed by any one or more of the following processes: the manual draping of a thermally softened film over a mold, or the pressure induced shaping of a softened film to a mold (e.g., vacuum forming), or the automatic high-speed indexing of a freshly extruded sheet having an accurately known temperature into a forming and trimming station, or the automatic placement, plug and/or pneumatic stretching and pressuring forming of a film.

Alternatively, the film can be wetted by any suitable means, for example directly by spraying a wetting agent (including water, a solution of the film composition, a plasticizer for the film composition, or any combination of the foregoing) onto the film, prior to feeding it onto the surface or once on the surface, or indirectly by wetting the surface or by applying a wet item onto the film.

Once a film has been heated and/or wetted, it may be drawn into an appropriate mold, preferably using a vacuum. The filling of the molded film can be accomplished by utilizing any suitable means. In some embodiments, the most preferred method will depend on the product form and required speed of filling. In some embodiments, the molded film is filled by in-line filling techniques. The filled, open packets are then closed forming the pouches, using a second film, by any suitable method. This may be accomplished while in horizontal position and in continuous, constant motion. The closing may be accomplished by continuously feeding a second film, preferably water-soluble film, over and onto the open packets and then preferably sealing the first and second film together, typically in the area between the molds and thus between the packets.

Any suitable method of sealing the packet and/or the individual compartments thereof may be utilized. Non-limiting examples of such means include heat sealing, solvent welding, solvent or wet sealing, and combinations thereof. Typically, only the area which is to form the seal is treated with heat or solvent. The heat or solvent can be applied by any method, typically on the closing material, and typically only on the areas which are to form the seal. If solvent or wet sealing or welding is used, it may be preferred that heat is also applied. Preferred wet or solvent sealing/welding methods include selectively applying solvent onto the area between the molds, or on the closing material, by for example, spraying or printing this onto these areas, and then applying pressure onto these areas, to form the seal. Sealing rolls and belts as described above (optionally also providing heat) can be used, for example.

The formed pouches may then be cut by a cutting device. Cutting can be accomplished using any known method. It may be preferred that the cutting is also done in continuous manner, and preferably with constant speed and preferably while in horizontal position. The cutting device can, for example, be a sharp item, or a hot item, or a laser, whereby in the latter cases, the hot item or laser 'burns' through the film/sealing area.

The different compartments of a multi-compartment pouches may be made together in a side-by-side style wherein the resulting, cojoined pouches may or may not be separated by cutting. Alternatively, the compartments can be made separately.

In some embodiments, pouches may be made according to a process comprising the steps of: a) forming a first compartment (as described above); b) forming a recess within some or all of the closed compartment formed in step (a), to generate a second molded compartment superposed above the first compartment; c) filling and closing the second compartments by means of a third film; d) sealing the first, second and third films; and e) cutting the films to produce a multi-compartment pouch. The recess formed in step (b) may be achieved by applying a vacuum to the compartment prepared in step (a).

In some embodiments, second, and/or third compartment(s) can be made in a separate step and then combined with the first compartment as described in European Patent Application Number 08101442.5 or WO 2009/152031.

In some embodiments, pouches may be made according to a process comprising the steps of: a)forming a first compartment, optionally using heat and/or vacuum, using a first film on a first forming machine; b) filling the first compartment with a first composition; c) on a second forming machine, deforming a second film, optionally using heat and vacuum, to make a second and optionally third molded compartment; d) filling the second and optionally third compartments; e) sealing the second and optionally third compartment using a third film; f) placing the sealed second and optionally third compartments onto the first compartment; g) sealing the first, second and optionally third compartments; and h) cutting the films to produce a multi-compartment pouch.

The first and second forming machines may be selected based on their suitability to perform the above process. In some embodiments, the first forming machine is preferably a horizontal forming machine, and the second forming machine is preferably a rotary drum forming machine, preferably located above the first forming machine.

It should be understood that by the use of appropriate feed stations, it may be possible to manufacture multi-compartment pouches incorporating a number of different or distinctive compositions and/or different or distinctive liquid, gel or paste compositions.

The film and/or pouch may be sprayed or dusted with a suitable material, such as an active agent, a lubricant, an aversive agent, or mixtures thereof. The film and/or pouch may be printed upon, for example, with an ink and/or an active agent.

Composition

The articles of the present disclosure include a composition, typically a household care composition. The composition is proximal to the water-soluble film. The composition may be less than about 10 cm, or less than about 5 cm, or less than about 1 cm from the film. Typically the composition is adjacent to the film or in contact with the film. The film may be in the form of a pouch or a compartment, containing the composition therein.

The present pouches may contain various compositions. A multi-compartment pouch may contain the same or different compositions in each separate compartment.

As described above, the film and pouch are particularly advantageous for packaging (e.g., in direct contact with) materials which have exchangeable hydrogen ions, for example compositions characterized by acid/base equilibria, such as amine-fatty acid equilibria and/or amine-anionic surfactant acid equilibria.

This feature of the disclosure may be utilized to keep compositions containing incompatible ingredients (e.g., bleach and enzymes) physically separated or partitioned from each other. It is believed that such partitioning may expand the useful life and/or decrease physical instability of such ingredients. Additionally or alternatively, such partitioning may provide aesthetic benefits as described in European Patent Application Number 09161692.0.

Non-limiting examples of useful household care compositions include light duty and heavy duty liquid detergent compositions, hard surface cleaning compositions, detergent gels commonly used for laundry, bleach and laundry additives, fabric enhancer compositions, shampoos, body washes, and other personal care compositions. Compositions of use in the present pouches may take the form of a liquid, solid or a powder. Liquid compositions may comprise a solid. Solids may include powder or agglomerates, such as micro-capsules, beads, noodles or one or more pearlized balls or mixtures thereof. Such a solid element may provide a technical benefit, through the wash or as a pre-treat, delayed or sequential release component; additionally or alternatively, it may provide an aesthetic effect.

The compositions encapsulated by the films described herein can have any suitable viscosity depending on factors such as formulated ingredients and purpose of the composition. In one embodiment, the composition has a high shear viscosity value, at a shear rate of 20 $s^{-1}$ and a temperature of 20° C., of 100 to 3,000 cP, alternatively 300 to 2,000 cP, alternatively 500 to 1,000 cP, and a low shear viscosity value, at a shear rate of 1 $s^{-1}$ and a temperature of 20° C., of 500 to 100,000 cP, alternatively 1000 to 10,000 cP, alternatively 1,300 to 5,000 cP. Methods to measure viscosity are known in the art. According to the present invention viscosity measurements are carried out using a rotational rheometer e.g. TA instruments AR550. The instrument includes a 40 mm 2° or 1° cone fixture with a gap of around 50-60 μm for isotropic liquids, or a 40 mm flat steel plate with a gap of 1000 μm for particles containing liquids. The measurement is carried out using a flow procedure that contains a conditioning step, a peak hold and a continuous ramp step. The conditioning step involves the setting of the measurement temperature at 20° C., a pre-shear of 10 seconds at a shear rate of $10s^{-1}$, and an equilibration of 60 seconds at the selected temperature. The peak hold involves applying a shear rate of 0.05 $s^{-1}$ at 20° C. for 3min with sampling every 10 s. The continuous ramp step is performed at a shear rate from 0.1 to 1200 $s^{-1}$ for 3 min at 20° C. to obtain the full flow profile.

In articles comprising laundry, laundry additive and/or fabric enhancer compositions, the compositions may comprise one or more of the following non-limiting list of ingredients: fabric care benefit agent; detersive enzyme; deposition aid; rheology modifier; builder;

bleach; bleaching agent; bleach precursor; bleach booster; bleach catalyst; perfume and/or perfume microcapsules (see for example U.S. Pat. No. 5,137,646); perfume loaded zeolite; starch encapsulated accord; polyglycerol esters; whitening agent; pearlescent agent; enzyme stabilizing systems; scavenging agents including fixing agents for anionic dyes, complexing agents for anionic surfactants, and mixtures thereof; optical brighteners or fluorescers; polymer including but not limited to soil release polymer and/or soil suspension polymer; dispersants; antifoam agents; non-aqueous solvent; fatty acid; suds suppressors, e.g., silicone suds suppressors (see: U.S. Publication No. 2003/0060390 A1, ¶65-77); cationic starches (see: US 2004/0204337 A1 and US 2007/0219111 A1); scum dispersants (see: US 2003/0126282 A1, ¶89-90); substantive dyes; hueing dyes (see: US US2014/0162929A1);

colorants; opacifier; antioxidant; hydrotropes such as toluenesulfonates, cumenesulfonates and naphthalenesulfonates; color speckles; colored beads, spheres or extrudates; clay softening agents; anti-bacterial agents. Any one or more of these ingredients is further described in described in European Patent Application Number 09161692.0, U.S. Publication Number 2003/0139312A1 and U.S. Patent Application No. 61/229,981. Additionally or alternatively, the compositions may comprise surfactants, quaternary ammonium compounds, and/or solvent systems. Quaternary ammonium compounds may be present in fabric enhancer compositions, such as fabric softeners, and comprise quaternary ammonium cations that are positively charged polyatomic ions of the structure $NR_4^+$, where R is an alkyl group or an aryl group.

Surfactants

The detergent compositions can comprise from about 1% to 80% by weight of a surfactant. Surfactant is particularly preferred as a component of the first composition. Preferably, the first composition comprises from about 5% to 50% by weight of surfactant. The second and third compositions may comprise surfactant at levels of from 0.1 to 99.9%.

Detersive surfactants utilized can be of the anionic, nonionic, zwitterionic, ampholytic or cationic type or can comprise compatible mixtures of these types. More preferably surfactants are selected from the group consisting of anionic, nonionic, cationic surfactants and mixtures thereof. Preferably the compositions are substantially free of betaine surfactants. Detergent surfactants useful herein are described in U.S. Pat. Nos. 3,664,961; 3,919,678; 4,222, 905; and 4,239,659. Anionic and nonionic surfactants are preferred.

Useful anionic surfactants can themselves be of several different types. For example, water-soluble salts of the higher fatty acids, i.e., "soaps", are useful anionic surfactants in the compositions herein. This includes alkali metal soaps such as the sodium, potassium, ammonium, and alkyl ammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Additional non-soap anionic surfactants which are suitable for use herein include the water-soluble salts, preferably the alkali metal, and ammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.) Examples of this group of synthetic surfactants include: a) the sodium, potassium and ammonium alkyl sulfates, especially those obtained by sulfating the higher alcohols ($C_8$-$C_{18}$) such as those produced by reducing the glycerides of tallow or coconut oil; b) the sodium, potassium and ammonium alkyl polyethoxylate sulfates, particularly those in which the alkyl group contains from 10 to 22, preferably from 12 to 18 carbon atoms, and wherein the polyethoxylate chain contains from 1 to 15, preferably 1 to 6 ethoxylate moieties; and c) the sodium and potassium alkylbenzene sulfonates in which the alkyl group contains from about 9 to about 15 carbon atoms, in straight chain or branched chain configuration, e.g., those of the type described in U.S. Pat. Nos. 2,220,099 and 2,477,383. Especially valuable are linear straight chain alkylbenzene sulfonates in which the average number of carbon atoms in the alkyl group is from about 11 to 13, abbreviated as $C_{11}$-$C_{13}$ LAS.

Preferred nonionic surfactants are those of the formula $R_1(OC_2H_4)_nOH$, wherein $R_1$ is a $C_{10}$-$C_{16}$ alkyl group or a $C_8$-$C_{12}$ alkyl phenyl group, and n is from 3 to about 80. Particularly preferred are condensation products of $C_{12}$-$C_{15}$ alcohols with from about 5 to about 20 moles of ethylene oxide per mole of alcohol, e.g., $C_{12}$-$C_{13}$ alcohol condensed with about 6.5 moles of ethylene oxide per mole of alcohol.

Solvent System

The solvent system in the present compositions can be a solvent system containing water alone or mixtures of organic solvents with water. Preferred organic solvents include 1,2-propanediol, ethanol, glycerol, dipropylene glycol, methyl propane diol and mixtures thereof. Other lower alcohols, $C_1$-$C_4$ alkanolamines such as monoethanolamine and triethanolamine, can also be used. Solvent systems can be absent, for example from anhydrous solid embodiments of the disclosure, but more typically are present at levels in the range of from about 0.1% to about 98%, preferably at least about 1% to about 50%, more usually from about 5% to about 25%. Typically, the present compositions, particularly when in liquid form, comprise less than 50% water, preferably from about 0.1% to about 20% water, or more preferably from about 0.5% to about 15%, or from about 5% to about 12%, by weight of the composition, of water.

The compositions herein can generally be prepared by mixing the ingredients together. If a pearlescent material is used it should be added in the late stages of mixing. If a rheology modifier is used, it is preferred to first form a pre-mix within which the rheology modifier is dispersed in a portion of the water and optionally other ingredients eventually used to comprise the compositions. This pre-mix is formed in such a way that it forms a structured liquid. To this structured pre-mix can then be added, while the pre-mix is under agitation, the surfactant(s) and essential laundry adjunct materials, along with water and whatever optional detergent composition adjuncts are to be used.

The pH of the useful compositions may be about 2 to about 12, about 5.5 to about 9.5, about 6 to about 8.5, or about 6.5 to about 8.2. Laundry detergent compositions may have a pH of about 6 to about 10, about 6.5 to about 8.5, about 7 to about 7.5, or about 8 to about 10. Auto-dishwashing compositions may have a pH of about 8 to about 12. Laundry detergent additive compositions may have a pH of about 4 to about 8. Fabric enhancers may have a pH of about from about 2 to about 8, or from about 2 to about 4, or from about 2.5 to about 3.5, or from about 2.7 to about 3.3.

The pH of the detergent is defined as the pH of an aqueous 10% (weight/volume) solution of the detergent at 20±2° C.; for solids and powdered detergent this is defined as the pH of an aqueous 1% (weight/volume) solution of the detergent at 20±2° C. Any meter capable of measuring pH to ±0.01 pH units is suitable. Orion meters (Thermo Scientific, Clintinpark-Keppekouter, Ninovesteenweg 198, 9320 Erembodegem-Aalst, Belgium) or equivalent are acceptable instruments. The pH meter should be equipped with a suitable glass electrode with calomel or silver/silver chloride reference. An example includes Mettler DB 115. The electrode shall be stored in the manufacturer's recommended electrolyte solution.

The 10% aqueous solution of the detergent is prepared according to the following procedure. A sample of 10±0.05 grams is weighted with a balance capable of accurately measuring to ±0.02 grams. The sample is transferred to a 100 mL volumetric flask, diluted to volume with purified water (deionized and/or distilled water are suitable as long as the conductivity of the water is <5 μS/cm), and thoroughly mixed. About 50 mL of the resulting solution is poured into a beaker, the temperature is adjusted to 20±2° C. and the pH is measured according to the standard procedure of the pH meter manufacturer (it is critical to follow the manufacturer's instructions to also set up and calibrate the pH assembly).

For solid and powdered detergents, the 1% aqueous solution of the detergent is prepared according to the following procedure. A sample of 10±0.05 grams is weighted with a balance capable of accurately measuring to ±0.02 grams. The sample is transferred to a volumetric flask of 1000 mL, diluted to volume with purified water (deionized and/or distilled water are suitable as long as the conductivity of the water is <5 μS/cm), and thoroughly mixed. About 50 mL of the resulting solution is poured into a beaker, the temperature is adjusted to 20±2° C. and the pH is measured according to the standard procedure of the pH meter manufacturer (it is critical to follow the manufacturer's instructions to also set up and calibrate the pH assembly).

Bleaches

Inorganic and organic bleaches are suitable cleaning actives for use herein. Inorganic bleaches include perhydrate salts such as perborate, percarbonate, perphosphate, persulfate and persilicate salts. The inorganic perhydrate salts are normally the alkali metal salts. The inorganic perhydrate salt may be included as the crystalline solid without additional protection. Alternatively, the salt can be coated as is known in the art.

Alkali metal percarbonates, particularly sodium percarbonate are preferred perhydrates for use in the detergent composition described herein. The percarbonate is most preferably incorporated into the products in a coated form which provides in-product stability. A suitable coating material providing in product stability comprises mixed salt of a water-soluble alkali metal sulphate and carbonate. Such coatings together with coating processes have previously been described in GB1,466,799, and U.S. Pat. Nos. 3,975,280; 4,075,116; and 5,340,496, each incorporated herein by reference. The weight ratio of the mixed salt coating material to percarbonate lies in the range from 1:99 to 1:9, and preferably from 1:49 to 1:19. Preferably, the mixed salt is of sodium sulphate and sodium carbonate which has the general formula $Na_2SO_4+n+Na_2CO_3$ wherein n is from 0.1 to 3, preferably from 0.3 to 1.0, and more preferably from 0.2 to 0.5. Another suitable coating material providing in product stability comprises sodium silicate of $SiO_2$: $Na_2O$ ratio from 1.8:1 to 3.0:1, preferably 1.8:1 to 2.4:1, and/or sodium metasilicate, preferably applied at a level of from 2% to 10%, (normally from 3% to 5%) of $SiO_2$ by weight of the inorganic perhydrate salt, such as potassium peroxymonopersulfate. Other coatings which contain magnesium silicate, silicate and borate salts, silicate and boric acids, waxes, oils, and fatty soaps can also be used advantageously Organic bleaches can include organic peroxyacids including diacyl and tetraacylperoxides, especially diperoxydodecanedioc acid, diperoxytetradecanedioc acid, and diperoxyhexadecanedioc acid. Dibenzoyl peroxide is a preferred organic peroxyacid herein. The diacyl peroxide, especially dibenzoyl peroxide, preferably can be present in the form of particles having a weight average diameter of from about 0.1 to about 100 microns, preferably from about 0.5 to about 30 microns, more preferably from about 1 to about 10 microns. Preferably, at least about 25% to 100%, more preferably at least about 50%, even more preferably at least about 75%, most preferably at least about 90%, of the particles are smaller than 10 microns, preferably smaller than 6 microns.

Other organic bleaches include the peroxy acids, particular examples being the alkylperoxy acids and the arylperoxy acids. Preferred representatives are: (a) peroxybenzoic acid and its ring-substituted derivatives, such as alkylperoxybenzoic acids, but also peroxy-α-naphthoic acid and magnesium monoperphthalate; (b) the aliphatic or substituted aliphatic peroxy acids, such as peroxylauric acid, peroxystearic acid, ε-phthalimidoperoxycaproic acid[phthaloiminoperoxyhexanoic acid (PAP)], o-carboxybenzamidoperoxycaproic acid, N-nonenylamidoperadipic acid and N-nonenylamidopersuccinates; and (c) aliphatic and araliphatic peroxydicarboxylic acids, such as 1,12-diperoxycarboxylic acid, 1,9-diperoxyazelaic acid, diperoxysebacic acid, diperoxybrassylic acid, the diperoxyphthalic acids, 2-decyldiperoxybutane-1,4-dioic acid, N,N-terephthaloyldi(6-aminopercaproic acid)

Bleach activators can include organic peracid precursors that enhance the bleaching action in the course of cleaning at temperatures of 60° C. and below. Bleach activators suitable for use herein include compounds which, under perhydrolysis conditions, give aliphatic peroxoycarboxylic acids having preferably from 1 to 10 carbon atoms, in particular from 2 to 4 carbon atoms, and/or optionally substituted perbenzoic acid. Suitable substances bear O-acyl and/or N-acyl groups of the number of carbon atoms specified and/or optionally substituted benzoyl groups. Preference is given to polyacylated alkylenediamines, in particular tetraacetylethylenediamine (TAED), acylated triazine derivatives, in particular 1,5-diacetyl-2,4-dioxohexahydro-1,3,5-triazine (DADHT), acylated glycolurils, in particular tetraacetylglycoluril (TAGU), N-acylimides, in particular N-nonanoylsuccinimide (NOSI), acylated phenolsulfonates, in particular n-nonanoyl- or isononanoyloxybenzenesulfonate (n- or iso-NOBS), carboxylic anhydrides, in particular phthalic anhydride, acylated polyhydric alcohols, in particular triacetin, ethylene glycol diacetate and 2,5-diacetoxy-2,5-dihydrofuran and also triethylacetyl citrate (TEAC).

Bleach catalysts preferred for use in the detergent composition herein include the manganese triazacyclononane and related complexes (U.S. Pat. No. 4,246,612, U.S. Pat. No. 5,227,084); Co, Cu, Mn and Fe bispyridylamine and related complexes (U.S. Pat. No. 5,114,611); and pentamine acetate cobalt(III) and related complexes (U.S. Pat. No. 4,810,410). A complete description of bleach catalysts suitable for use herein can be found in U.S. Pat. No. 6,599,871, incorporated herein by reference.

Dishwashing Agents

A preferred surfactant for use in automatic dishwashing detergents is low foaming by itself or in combination with other components (e.g. suds suppressors). Preferred for use herein are low and high cloud point nonionic surfactants and mixtures thereof including nonionic alkoxylated surfactants (especially ethoxylates derived from $C_6$-$C_{18}$ primary alcohols), ethoxylated-propoxylated alcohols (e.g., Olin Corporation's POLY-TERGENT® SLF18), epoxy-capped poly (oxyalkylated) alcohols (e.g., Olin Corporation's POLY-TERGENT® SLF18B—see WO-A-94/22800), ether-capped poly(oxyalkylated) alcohol surfactants, and block polyoxyethylene-polyoxypropylene polymeric compounds such as PLURONIC®, REVERSED PLURONIC®, and TETRONIC® by the BASF-Wyandotte Corp., Wyandotte, Mich.; amphoteric surfactants such as the $C_{12}$-$C_{20}$ alkyl amine oxides (preferred amine oxides for use herein include lauryldimethyl amine oxide and hexadecyl dimethyl amine oxide), and alkyl amphocarboxylic surfactants such as MIRANOL™ C2M; and zwitterionic surfactants such as the betaines and sultaines; and mixtures thereof. Surfactants suitable for use herein are disclosed, for example, in U.S. Pat. Nos. 3,929,678 , 4,259,217, EP-A-0414 549, WO-A-93/08876 and WO-A-93/08874. Surfactants can be present at a level of from about 0.2% to about 30% by weight, more preferably from about 0.5% to about 10% by weight, most preferably from about 1% to about 5% by weight of a detergent composition.

Other Compositions and Additives

Builders suitable for use in the detergent composition described herein include water-soluble builders, including citrates, carbonates, silicate and polyphosphates, e.g. sodium tripolyphosphate and sodium tripolyphosphate hexahydrate, potassium tripolyphosphate and mixed sodium and potassium tripolyphosphate salts.

Enzymes suitable for use in the detergent composition described herein include bacterial and fungal cellulases including CAREZYME and CELLUZYME (Novo Nordisk A/S); peroxidases; lipases including AMANO-P (Amano Pharmaceutical Co.), M1 LIPASE and LIPOMAX (Gist- Brocades) and LIPOLASE and LIPOLASE ULTRA (Novo); cutinases; proteases including ESPERASE, ALCALASE, DURAZYM and SAVINASE (Novo) and MAXATASE, MAXACAL, PROPERASE and MAXAPEM (Gist-Brocades); α and β amylases including PURAFECT OX AM (Genencor) and TERMAMYL, BAN, FUNGAMYL, DURAMYL, and NATALASE (Novo); pectinases; and mixtures thereof. Enzymes can be added herein as prills, granulates, or cogranulates at levels typically in the range from about 0.0001% to about 2% pure enzyme by weight of the cleaning composition.

Suds suppressers suitable for use in the detergent composition described herein include nonionic surfactants having a low cloud point. "Cloud point" as used herein, is a well known property of nonionic surfactants which is the result of the surfactant becoming less soluble with increasing temperature, the temperature at which the appearance of a second phase is observable is referred to as the "cloud point." As used herein, a "low cloud point" nonionic surfactant is defined as a nonionic surfactant system ingredient having a cloud point of less than 30° C., preferably less than about 20° C., and even more preferably less than about 10° C., and most preferably less than about 7.5° C. Low cloud point nonionic surfactants can include nonionic alkoxylated surfactants, especially ethoxylates derived from primary alcohol, and polyoxypropylene/polyoxyethylene/polyoxypropylene (PO/EO/PO) reverse block polymers. Also, such low cloud point nonionic surfactants can include, for example, ethoxylated-propoxylated alcohol (e.g., BASF POLY-TERGENT SLF18) and epoxy-capped poly(oxyalkylated) alcohols (e.g., BASF POLY-TERGENT SLF18B series of nonionics, as described, for example, in U.S. Pat. No. 5,576,281).

Other suitable components for use in the detergent composition described herein include cleaning polymers having anti-redeposition, soil release or other detergency properties. Anti-redeposition polymers for use herein include acrylic acid containing polymers such as SOKALAN PA30, PA20, PA15, PA10 and SOKALAN CP10 (BASF GmbH), ACUSOL 45N, 480N, 460N (Rohm and Haas), acrylic acid/maleic acid copolymers such as SOKALAN CP5 and acrylic/methacrylic copolymers. Other suitable polymers include amine-based polymers such as alkoxylated polyalkyleneimines (e.g., PEI600 EO20 and/or ethoxysulfated hexamethylene diamine dimethyl quats). Soil release polymers for use herein include alkyl and hydroxyalkyl celluloses (U.S. Pat. No. 4,000,093), polyoxyethylenes, polyoxypropylenes and copolymers thereof, and nonionic and anionic polymers based on terephthalate esters of ethylene glycol, propylene glycol and mixtures thereof.

Heavy metal sequestrants and crystal growth inhibitors are also suitable for use in the detergent, for example diethylenetriamine penta(methylene phosphonate), ethylenediamine tetra(methylene phosphonate) hexamethylenediamine tetra(methylene phosphonate), ethylene diphosphonate, hydroxy-ethylene-1,1-diphosphonate, nitrilotriacetate, ethylenediaminotetracetate, ethylenediamine-N,N'-disuccinate in their salt and free acid forms.

Suitable for use in the detergent composition described herein is also a corrosion inhibitor, for example organic silver coating agents (especially paraffins such as WINOG 70 sold by Wintershall, Salzbergen, Germany), nitrogen-containing corrosion inhibitor compounds (for example benzotriazole and benzimadazole—see GB-A-1137741) and Mn(II) compounds, particularly Mn(II) salts of organic ligands.

Other suitable components for use in the detergent composition herein include enzyme stabilizers, for example calcium ion, boric acid and propylene glycol.

Suitable rinse additives are known in the art. Commercial rinse aids for dishwashing typically are mixtures of low-foaming fatty alcohol polyethylene/polypropylene glycol ethers, solubilizers (for example cumene sulfonate), organic acids (for example citric acid) and solvents (for example ethanol). The function of such rinse aids is to influence the interfacial tension of the water in such a way that it is able to drain from the rinsed surfaces in the form of a thin coherent film, so that no water droplets, streaks, or films are left after the subsequent drying process. European Patent 0 197 434 B1 describes rinse aids which contain mixed ethers as surfactants. Rinse additives such as fabric softeners and the like are also contemplated and suitable for encapsulation in a film according to the disclosure herein.

Methods of Use

The films and articles described herein, as well as compositions contained therein, may be used to treat a substrate, e.g., fabric or a hard surface, for example by contacting the substrate with the film, article, and/or composition contained therein. The contacting step may occur manually or in an automatic machine, e.g., an automatic (top or front-loading) laundry machine or an automatic dishwashing machine. The contacting step may occur in the presence of water, which may be at a temperature up to about 80° C., or up to about 60° C., or up to about 40° C., or up to about 30° C., or up to about 20° C., or up to about 15° C., or up to about 10° C., or up to about 5° C. As noted above, the present films and articles made therefrom are particularly suited for cold water dissolution and therefore provide benefits in cold-water washes (e.g., from about 1° C. to about 30° C., or from about 5° C. to about 20° C.). The contacting step may be followed by a multi-rinse cycle or even by a single rinse cycle; because the film has good dissolution properties, less water is required to dissolve the film and/or release the contents contained therein.

Specific contemplated aspects of the disclosure are herein described in the following numbered paragraphs.

1A. An article comprising a water-soluble film and a household composition proximal to the film, where the film comprises: a polyvinyl alcohol (PVOH) resin blend comprising: a first PVOH copolymer comprising a first anionic monomer unit, the first PVOH copolymer having a first level of incorporation ($a_1$) of the first anionic monomer unit; and a second PVOH copolymer comprising a second anionic monomer unit, the second PVOH copolymer having a second level of incorporation ($a_2$) of the second anionic monomer unit; wherein $a_1-a_2$ is greater than zero, and the first anionic monomer unit and the second anionic monomer unit are the same or different.

2A. The article of paragraph 1A, wherein: the first PVOH copolymer is present in an amount in a range from about 10 wt. % to about 75 wt. % of total PVOH polymers and PVOH copolymers in the film.

3A. The article of any of the foregoing A paragraphs, wherein the second PVOH copolymer is present in an amount in a range of about 25 wt. % to about 90 wt. % of total PVOH polymers and PVOH copolymers in the film.

4A. The article of any of the foregoing A paragraphs, wherein the first anionic monomer unit and the second anionic monomer unit are together present in a combined amount in a range of about 2.0 mol. % to about 3.5 mol. % of total PVOH polymers and PVOH copolymers in the film.

5A. The article of paragraph 1A, wherein: the first anionic monomer unit and the second anionic monomer unit are present in a combined amount in a range of about 2.0 mol. % to about 3.5 mol. % of total PVOH polymers and PVOH copolymers in the film.

6A. The article of any of the foregoing A paragraphs, wherein the first anionic monomer and the second anionic monomer are independently selected from the group consisting of vinyl acetic acid, maleic acid, monoalkyl maleate, dialkyl maleate, monomethyl maleate, dimethyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sulfoethyl acrylate, alkali metal salts of the foregoing, esters of the foregoing, and combinations thereof.

7A. The article of any of the foregoing A paragraphs, wherein the first anionic monomer is selected from the group consisting of acrylamido methylpropanesulfonic acids, alkali metal salts thereof, and combinations thereof.

8A. The article of paragraph 7A, wherein the first anionic monomer is present in an amount less than about 3 mol. % of total PVOH polymers and PVOH copolymers in the film.

9A. The article of any of paragraphs 2A to 8A, wherein the second anionic monomer is selected from the group consisting of monomethyl maleate, alkali metal salts thereof, and combinations thereof.

10A. The article of any of paragraphs 2A to 9A, wherein the first anionic monomer unit and the second anionic monomer unit are different.

11A. The article of any of paragraphs 2A to 9A, wherein the first anionic monomer unit and the second anionic monomer unit are the same.

12A. The article of any of paragraphs 2A to 9A, wherein: the first anionic monomer is selected from the group consisting of acrylamido methylpropanesulfonic acids, alkali metal salts thereof, and combinations thereof; the first PVOH copolymer is present in an amount in a range from about 10 wt. % to about 40 wt. % of total PVOH polymers and PVOH copolymers in the film; the second anionic monomer is selected from the group consisting of monomethyl maleate, alkali metal salts thereof, and combinations thereof; the second PVOH copolymer is present in an amount in a range of about 60 wt. % to about 90 wt. % of total PVOH polymers and PVOH copolymers in the film; $a_1-a_2$ is in a range of about 1 mol. % to about 3 mol. %; $a_1$ is in a range of about 3 mol. % to about 5 mol. %; $a_2$ is in a range of about 1 mol. % to about 3 mol. %; and the first anionic monomer unit and the second anionic monomer unit are present in a combined amount in a range of about 2.0 mol. % to about 2.8 mol. % of total PVOH polymers and PVOH copolymers in the film.

13A. The article of any of the foregoing A paragraphs, wherein the water-soluble film has a residue value of about 48 wt. % or less as measured by the Dissolution Chamber Test.

14A. The article of any of the foregoing A paragraphs, wherein the water-soluble film has an average tensile strength value of at least about 33 MPa as measured by the Tensile Strength Test.

15A. The article of any of the foregoing A paragraphs, wherein the water-soluble film has a modulus value of at least about 12 N/mm$^2$ as measured by the Modulus Test.

16A. The article of any of the foregoing A paragraphs, wherein: the water-soluble film has a Residue-AMPS Factor (RAF) value in a range of about 55 to about 100; the RAF value is defined as RAF=(2×DC)+(10×A); DC is the residue value in weight percent of the film as measured by the Dissolution Chamber Test; and A is the level of incorporation in mole percent of all acrylamido methylpropanesulfonic acid anionic polymerized monomers relative to total PVOH polymers and PVOH copolymers in the film.

17A. The article of any of the foregoing A paragraphs, wherein the PVOH resin blend consists essentially of the first PVOH copolymer and the second PVOH copolymer.

18A. The article of any of the foregoing A paragraphs, wherein the first PVOH copolymer and the second PVOH copolymer each independently have a degree of hydrolysis in a range of about 75% to about 99%.

19A. The article of any of the foregoing A paragraphs, wherein the first PVOH copolymer has a 4% solution viscosity at 20° C. in a range of about 4 cP to about 24 cP, and the second PVOH polymer or copolymer has a 4% solution viscosity at 20° C. in a range of about 12 cP to about 30 cP.

20A. The article of any of the foregoing A paragraphs, wherein the PVOH resin blend comprises a third PVOH polymer.

21A. The article of any of the foregoing A paragraphs, wherein the water-soluble film further comprises at least a third water-soluble polymer which is other than a PVOH polymer.

22A. The article of the foregoing paragraph, wherein the third water-soluble polymer is selected from the group consisting of polyethyleneimines, polyvinyl pyrrolidones, polyalkylene oxides, polyacrylamides, cellulose ethers, cellulose esters, cellulose amides, polyvinyl acetates, polyamides, gelatines, methylcelluloses, carboxymethylcelluloses and salts thereof, dextrins, ethylcelluloses, hydroxyethyl celluloses, hydroxypropyl methylcelluloses, maltodextrins, starches, modified starches, guar gum, gum Acacia, xanthan gum, carrageenan, polyacrylates and salts thereof, copolymers thereof, blends thereof, and combinations thereof.

23A. The article of any of the foregoing A paragraphs, wherein the water-soluble film further comprises one or more components selected from the group consisting of plasticizers, plasticizer compatibilizers, lubricants, release agents, fillers, extenders, cross-linking agents, antiblocking agents, antioxidants, detackifying agents, antifoams, nanoparticles, bleaching agents, surfactants, and combinations thereof.

24A. The article of any of the foregoing A paragraphs, wherein the water-soluble film further comprises one or more plasticizers in an amount in a range of about 1 wt. % to about 40 wt. % of the film.

25A. The article of any of the foregoing A paragraphs in the form of a pouch defining an interior pouch volume.

26A. The article of the foregoing paragraph, where the household care composition is contained in the interior pouch volume.

1B. An article comprising: a polyvinyl alcohol (PVOH) resin blend and a household composition proximal to the film, where the film comprises: a first PVOH copolymer comprising a first anionic monomer unit; and a second PVOH copolymer comprising a second anionic monomer unit which is the same as or different from the first anionic monomer unit; wherein the water-soluble film has the following property (a) and optionally at least one of the properties (b) and (c): (a) the water-soluble film has a residue value of about 48 wt. % or less as measured by the Dissolution Chamber Test; (b) the water-soluble film has an average tensile strength value of at least about 33 MPa as measured by the Tensile Strength Test; and (c) the water-soluble film has a modulus value of at least about 12 N/mm² as measured by the Modulus Test.

2B. The article of paragraph 1B, wherein the water-soluble film has the property (b).

3B. The article of paragraph 1B, wherein the water-soluble film has the property (c).

4B. The article of paragraph 1B, wherein the water-soluble film has the properties (b) and (c).

5B. The article of paragraph 4B, wherein: the first anionic monomer is selected from the group consisting of acrylamido methylpropanesulfonic acids, alkali metal salts thereof, and combinations thereof; the second anionic monomer is selected from the group consisting of monomethyl maleate, alkali metal salts thereof, and combinations thereof; the water-soluble film has a residue value in a range of about 35 wt. % to about 48 wt. % as measured by the Dissolution Chamber Test; the water-soluble film has an average tensile strength value in a range of about 33 MPa to about 38 MPa as measured by the Tensile Strength Test; and the water-soluble film has a modulus value in a range of about 12.5 N/mm² to about 15 N/mm² as measured by the Modulus Test.

6B. An article comprising: a polyvinyl alcohol (PVOH) resin blend and a household composition proximal to the film, where the film comprises: a first PVOH copolymer comprising a first anionic monomer unit; and a second PVOH copolymer comprising a second anionic monomer unit which is the same as or different from the first anionic monomer unit; wherein the water-soluble film has the following property (a) and optionally one or both of the properties (b) and (c): (a) the water-soluble film has a residue value in a range of about 12 wt. % to about 48 wt. % as measured by the Dissolution Chamber Test; (b) the water-soluble film has an average tensile strength value of at least about 33 MPa as measured by the Tensile Strength Test; and (c) the water-soluble film has a modulus value of at least about 12 N/mm² as measured by the Modulus Test.

7B. The article of paragraph 6B, wherein the water-soluble film has the property (b).

8B. The article of paragraph 6B, wherein the water-soluble film has the property (c).

9B. The article of paragraph 6B, wherein the water-soluble film has the properties (b) and (c).

10B. The article of any of the foregoing B paragraphs, wherein: the water-soluble film has a Residue-AMPS Factor (RAF) value in a range of about 54 to about 100; the RAF value is defined as RAF=(2×DC)+(10×A); DC is the residue value in weight percent of the film as measured by the Dissolution Chamber Test; and A is the level of incorporation in mole percent of all acrylamido methylpropanesulfonic acid anionic polymerized monomers relative to total PVOH polymers and PVOH copolymers in the film.

11B. The article of any of the foregoing B paragraphs, wherein the first anionic monomer is selected from the group consisting of vinyl acetic acid, maleic acid, monoalkyl maleate, dialkyl maleate, monomethyl maleate, dimethyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sulfoethyl acrylate, alkali metal salts of the foregoing, esters of the foregoing, and combinations thereof.

12B. The article of any of the foregoing B paragraphs, wherein the first anionic monomer is selected from the group consisting of acrylamido methylpropanesulfonic acids, alkali metal salts thereof, and combinations thereof.

13B. The article of the foregoing paragraph, wherein the first anionic monomer is present in an amount less than about 3 mol. % of total PVOH polymers and PVOH copolymers in the film.

14B. The article of the foregoing B paragraphs, wherein the second anionic monomer is selected from the group consisting of vinyl acetic acid, maleic acid, monoalkyl maleate, dialkyl maleate, monomethyl maleate, dimethyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sulfoethyl acrylate, alkali metal salts of the foregoing, esters of the foregoing, and combinations thereof.

15B. The article of any of the foregoing B paragraphs, wherein: a corresponding first PVOH copolymer water-soluble film has the property (a); and a corresponding second PVOH copolymer water-soluble film does not have the property (a).

16B. The article of any of the foregoing B paragraphs, wherein: a corresponding first PVOH copolymer water-soluble film does not have the property (b); and a corresponding second PVOH copolymer water-soluble film has the property (b).

17B. The article of any of the foregoing B paragraphs, wherein: a corresponding first PVOH copolymer water-soluble film does not have the property (c); and a corresponding second PVOH copolymer water-soluble film has the property (c).

18B. The article of any of the foregoing B paragraphs, wherein the PVOH resin blend consists essentially of the first PVOH copolymer and the second PVOH copolymer.

19B. The article of any of the foregoing B paragraphs, wherein the first PVOH copolymer and the second PVOH copolymer each independently have a degree of hydrolysis in a range of about 75% to about 99%.

20B. The article of any of the foregoing B paragraphs, wherein the first PVOH copolymer has a 4% solution viscosity at 20° C. in a range of about 4 cP to about 24 cP, and the second PVOH copolymer has a 4% solution viscosity at 20° C. in a range of about 12 cP to about 30 cP.

21B. The article of any of the foregoing B paragraphs, wherein the PVOH resin blend comprises a third PVOH polymer.

22B. The article of any of the foregoing B paragraphs, wherein the water-soluble film further comprises at least a third water-soluble polymer which is other than a PVOH polymer.

23B. The article of the foregoing paragraph, wherein the third water-soluble polymer is selected from the group consisting of polyethyleneimines, polyvinyl pyrrolidones, polyalkylene oxides, polyacrylamides, cellulose ethers, cellulose esters, cellulose amides, polyvinyl acetates, polyamides, gelatines, methylcelluloses, carboxymethylcelluloses and salts thereof, dextrins, ethylcelluloses, hydroxyethyl celluloses, hydroxypropyl methylcelluloses, maltodextrins, starches, modified starches, guar gum, gum Acacia, xanthan gum, carrageenan, polyacrylates and salts thereof, copolymers thereof, blends thereof, and combinations thereof.

24B. The article of any of the foregoing B paragraphs, wherein the water-soluble film further comprises one or more components selected from the group consisting of plasticizers, plasticizer compatibilizers, lubricants, release agents, fillers, extenders, cross-linking agents, antiblocking agents, antioxidants, detackifying agents, antifoams, nanoparticles, bleaching agents, surfactants, and combinations thereof.

25B. The article of any of the foregoing B paragraphs, wherein the water-soluble film further comprises one or more plasticizers in an amount in a range of about 1 wt. % to about 40 wt. % of the film.

26B. The article of any of the foregoing B paragraphs where the film is in the form of a pouch defining an interior pouch volume.

27B. The article of the foregoing paragraph, where the household care composition is contained in the interior pouch volume.

1C. The article of any of the foregoing A-B paragraphs, wherein the article is in the form of a pouch comprising at least one sealed compartment.

2C. The article of paragraph 1C, wherein the at least one compartment comprises at least one wall, wherein the at least one wall comprises the water-soluble film.

3C. The article of any of the foregoing C paragraphs, wherein the pouch comprises at least two compartments.

4C. The article of any of the foregoing C paragraphs, wherein a second compartment is superposed on a first compartment.

5C. The article of any of the foregoing C paragraphs, wherein the pouch comprises at least three compartments.

6C. The article of any of the foregoing C paragraphs, wherein a second compartment and a third compartment are superposed on a first compartment.

7C. The article of any of the foregoing C paragraphs, where the household composition is contained in the at least one compartment.

8C. The article of any preceding A-C paragraph, wherein the household care composition is selected from the group consisting of light duty liquid detergents compositions, heavy duty liquid detergent compositions, hard surface cleaning compositions, detergent gels commonly used for laundry, bleaching compositions, laundry additives, fabric enhancer compositions, shampoos, body washes, other personal care compositions, and mixtures thereof.

9C. The article of any preceding A-C paragraph, wherein the household care composition comprises surfactant.

10C. The article of any preceding A-C paragraph, wherein the household care composition is in the form of a liquid, solid, a powder, or mixtures thereof.

11C. The article of any preceding A-C paragraph, wherein the household care composition is in contact with the film.

1D. A method of forming an article of any of the foregoing A-C paragraphs, where the method includes the steps of: providing the film, where the film defines an interior pouch container volume; filling the container volume with a household care composition; and sealing the film to form a sealed compartment, where the sealed compartment contains the composition.

2D. A method of treating a substrate, where the method includes the step of contacting the substrate with the article of any of the foregoing A-C paragraphs, or compositions contained therein, typically in the presence of water.

Dissolution Chamber Residue Test

A water-soluble film characterized by or to be tested for undissolved residue according to the Dissolution Chamber (DC) Test is analyzed as follows using the following materials:

1. Beaker (4000 ml);
2. Stainless steel washers (3.5" (88.9 mm) OD, 1.875" ID (47.6 mm), 0.125" (3.18 mm) thick);
3. Styrene-butadiene rubber gaskets (3.375" (85.7 mm) OD, 1.91" ID (48 5 mm), 0.125" thick (3.18 mm));
4. Stainless steel screens (3.0" (76.2 mm) OD, 200×200 mesh, 0.0021" (0.053 mm) wire OD, 304SS stainless steel wire cloth);
5. Thermometer (0° C. to 100° C., accurate to +/−1° C.);
6. Cutting punch (1.5" (38 1 mm) diameter);
7. Timer (accurate to the nearest second);
8. Reverse osmosis (RO) water;
9. Binder clips (size #5 or equivalent);
10. Aluminum pans (2.0" (50.8 mm) OD); and
11. Sonicator.

For each film to be tested, three test specimens are cut from a selected test film having a thickness of 3.0±0.10 mil (or 76.2±2.5 µm) using the cutting punch. If cut from a film web made by a continuous process, the specimens should be cut from areas of web evenly spaced along the transverse direction of the web (i.e., perpendicular to the machine direction). Each test specimen is then analyzed using the following procedure:

1. Weigh the film specimen and track the specimen through the test. Record the initial film weight ($F_o$).
2. Weigh a set of two sonicated, clean, and dry screens for each specimen and track them through the test. Record the initial screen weights (collectively $S_o$ for the two screens combined).
3. Assemble a specimen dissolution chamber by flatly sandwiching the film specimen between the center of the two screens, followed by the two rubber gaskets (one gasket on each side between the screen and washer), and then the two washers.
4. Secure the dissolution chamber assembly with four binder clips evenly spaced around the washers and the clips folded back away from the screens. 5. Fill the beaker with 1,500 ml of RO water at laboratory room temperature (72+/−3° F., 22+/−2° C.) and record the room temperature.
6. Set the timer to a prescribed immersion time of 5 minutes.
7. Place the dissolution chamber assembly into the beaker and immediately start the timer, inserting the dissolution chamber assembly at an approximate 45 degree entry angle into the water surface. This entry angle helps remove air bubbles from the chamber. The dissolution chamber assembly rests on the beaker bottom such that the test specimen film is positioned horizontally about 10 mm from the bottom. The four folded-back binder clips of the dissolution chamber assembly are suitable to maintain the about 10 mm film clearance from the beaker bottom, however, any other equivalent support means may be used.
8. At the prescribed elapsed prescribed immersion time of 5 minutes, slowly remove the dissolution chamber assembly from the beaker at an approximate 45 degree angle.
9. Hold the dissolution chamber assembly horizontally over the aluminum pan to catch any drips from the screens and carefully remove the binder clips, washers, and gaskets. Do not break open the sandwiched screens.
10. Place the sandwiched screens (i.e., screen/residual undissolved film/screen) over the aluminum pan and into an oven at 100° C. for 30 minutes to dry.
11. Weigh the dried set of sandwiched screens including any residual undissolved film therein. Measure and add to this dried screen weight any dried film drippings captured in and recovered from (e.g., by scraping) the pan when the dissolution chamber assembly was first removed from the beaker and during drying. Record the final sandwiched screen weight (collectively $S_f$, including the dried film drippings).

12. Calculate % residue ("DC residue") left for the film specimen: % DC residue=$100*((S_f-S_o)/F_o)$.

13. Clean the sandwiched screens by soaking them in a beaker of RO water for about 20 minutes. Then, take them apart and do a final rinse in the sonicator (turned on and filled with RO water) for at least 5 minutes or until no residue is visible on the screens.

Suitable behavior of water-soluble films according to the disclosure is marked by DC residue values of about 45 wt. % or less or about 48 wt. % or less as measured by the DC Test. Generally, lower DC residue values are desirable to reduce the likelihood of residual film remaining on a washed article after aggressive washing conditions (e.g., in low water conditions (such as in overloading of the washing machine) and in cold wash water conditions). In various embodiments, the water-soluble film has a DC residue value of at least 1, 2, 5, 10, 12, 15, 25, 30, or 35 wt. % and/or up to about 15, 20, 30, 40, 45, or 48 wt. %; (e.g., about 5 wt. % to about 48 wt. %, or about 12 wt. % to about 48 wt. %, or about 35 wt. % to about 48 wt. %, or about 10 wt. % to about 45 wt. %, or about 20 wt. % to about 45 wt. %, or about 30 wt. % to about 40 wt. %).

Tensile Strength Test and Modulus Test

A water-soluble film characterized by or to be tested for tensile strength according to the Tensile Strength (TS) Test and modulus (or tensile stress) according to the Modulus (MOD) Test is analyzed as follows. The procedure includes the determination of tensile strength and the determination of modulus at 100% elongation according to ASTM D 882 ("Standard Test Method for Tensile Properties of Thin Plastic Sheeting") or equivalent. An INSTRON tensile testing apparatus (Model 5544 Tensile Tester or equivalent) is used for the collection of film data. A minimum of three test specimens, each cut with reliable cutting tools to ensure dimensional stability and reproducibility, are tested in the machine direction (MD) (where applicable) for each measurement. Tests are conducted in the standard laboratory atmosphere of 23±2.0° C. and 35±5% relative humidity. For tensile strength or modulus determination, 1"-wide (2.54 cm) samples of a single film sheet having a thickness of 3.0±0.15 mil (or 76.2±3.8 μm) are prepared. The sample is then transferred to the INSTRON tensile testing machine to proceed with testing while minimizing exposure in the 35% relative humidity environment. The tensile testing machine is prepared according to manufacturer instructions, equipped with a 500 N load cell, and calibrated. The correct grips and faces are fitted (INSTRON grips having model number 2702-032 faces, which are rubber coated and 25 mm wide, or equivalent). The samples are mounted into the tensile testing machine and analyzed to determine the 100% modulus (i.e., stress required to achieve 100% film elongation) and tensile strength (i.e., stress required to break film).

Suitable behavior of water-soluble films according to the disclosure is marked by TS values of at least about 33 MPa as measured by the TS Test. Generally, higher TS values are desirable because they correspond to stronger pouch seals when the film is the limiting or weakest element of a seal. In various embodiments, the water-soluble film has a TS value of at least about 33, 34, 35, or 40 MPa and/or up to about 35, 38, 40, 45, or 50 MPa (e.g., about 33 MPa to about 48 MPa or about 33 MPa to about 38 MPa). Alternatively or additionally, an upper bound for a suitable TS value range can be a TS value for a corresponding water-soluble film having only a single PVOH polymer or PVOH copolymer of the PVOH polymers and PVOH copolymers in the PVOH resin blend (e.g., a corresponding single-resin film having the higher TS value).

Suitable behavior of water-soluble films according to the disclosure is marked by MOD values of at least about 12 N/mm$^2$ as measured by the MOD Test. Generally, higher MOD values are desirable because they correspond to pouches having a greater stiffness and a lower likelihood of deforming and sticking to each other when loaded on top of each other during production or in final consumer packaging. In various embodiments, the water-soluble film has a MOD value of at least about 12, 12.5, 13, 14, or 16 N/mm$^2$ and/or up to about 13, 14, 15, 16, 18, or 20 N/mm$^2$ (e.g., about 12 N/mm$^2$ to about 16 N/mm$^2$ or about 12.5 N/mm$^2$ to about 15 N/mm$^2$) Alternatively or additionally, an upper bound for a suitable MOD value range can be a MOD value for a corresponding water-soluble film having only a single PVOH polymer or PVOH copolymer of the PVOH polymers and PVOH copolymers in the PVOH resin blend (e.g., a corresponding single-resin film having the higher MOD value).

Residue-AMPS Factor

It has been observed that PVOH copolymers with anionic aminopropyl sulfonic acid salts (AMPS), for example those with 2-acrylamido-1-methylpropanesulfonic acid, 2-acrylamido-2-methylpropanesulfonic acid, and/or 2-methylacrylamido-2-methylpropanesulfonic acid comonomers and salts thereof, can with age exhibit cleavage of the AMPS group from the polymer. This scission of AMPS groups from the polymer results in free aminopropyl sulfonate molecules in the film. Such molecules are surface active and can migrate to the film surface, where they can form crystals which are visually unacceptable (i.e., resulting in an undesirable film whitening), may lead to sealing problems particularly when a water seal is used to form a pouch, and may enhance the rate of undesirable lactone ring formation in the water-soluble film resin. These problems increase correspondingly with an increasing level of incorporation of an AMPS comonomer (e.g., expressed as a mol. % of AMPS) in the PVOH anionic copolymer.

As illustrated in Examples 1-5 below, the DC residue value of a water-soluble film is strongly influenced by the anionic content of PVOH anionic copolymer resins in the film. Levels of up to about 4 mol. % AMPS in PVOH-co-AMPS copolymers are particularly effective at reducing the DC residue levels.

Thus, although PVOH-co-AMPS copolymers are effective in reducing DC residue levels in a film at higher AMPS levels, such higher AMPS levels can be problematic based on increasing degrees of AMPS cleavage in the copolymer and are desirably avoided. It was recognized that it was desirable for both DC residue and AMPS levels to be reduced, with both factors ideally being at or close to zero. It was further recognized that both factors had competing advantages and disadvantages within a given film (e.g., higher AMPS levels lowered DC residue but increased problems related to AMPS cleavage and vice versa). It was further recognized that each of the parameters were not of equal importance and were therefore empirically weighted according to their overall impact on film performance, and the interaction between the parameters was characterized by the following empirical relationship for a Residue-AMPS Factor (RAF) according to Equation I:

$$RAF=(2\times DC)+(10\times A). \quad (I)$$

In Equation I, DC is the DC residue value (in weight percent) of the film as measured by the DC test above, and A is the level of incorporation (in mole percent) of all acrylamido methylpropanesulfonic acid anionic polymerized monomers (e.g., including acid, salt, and optionally ester forms thereof) relative to total PVOH polymers and PVOH copolymers in the film.

A water-soluble film to be evaluated for its RAF value is first analyzed according to the DC test above to determine the DC residue value. The AMPS level of incorporation A can be calculated based on a known PVOH resin formulation or measured according to known analytical techniques (e.g., by analyzing the PVOH resin directly or by first extracting the PVOH resin from a water-soluble film for subsequent analysis). Suitable methods for determining the AMPS level of incorporation A in PVOH include elemental analysis and proton NMR. Using an elemental analysis technique, determination of total elemental nitrogen relative to the PVOH resin polymer can be correlated to the AMPS level (i.e., where AMPS monomer units include nitrogen, while vinyl alcohol and vinyl acetate monomer units do not). For proton NMR, a PVOH sample can be analyzed as follows. PVOH sample powder is washed with methanol using soxhlet extraction for 24 hours, and then it is dried under reduced pressure at ambient temperature for 24 hours. It is then dissolved into Dimethyl Sulfoxide-D6, and the proton NMR spectrum is obtained using 400 MHz proton NMR at 80° C. (256 scans standard). The amount of modification of the PVOH is then calculated from peaks in the NMR spectrum, including peak $\alpha$ which represents the —CH— groups of the main chain where acetate groups are attached (4.65-5.15 ppm), peak $\beta$ which represents the —CH— groups of the main chain where alcohol groups are attached (3.60-4.00 ppm), and peak $\gamma$ which represents —CH$_2$— groups of the AMPS unit (2.60-2.90 ppm). The AMPS level of incorporation A is calculated using Equation II, where the values of $\alpha$, $\beta$, $\gamma$ are peak area integration values from the proton NMR spectrum:

$$A(\text{mol. \%})=100\times(\gamma/(2\alpha+2\beta+\gamma)). \quad (II)$$

Suitable behavior of water-soluble films according to the disclosure is marked by RAF values in a range of about 54 to about 100, or about 85 to about 98, or about 92 to about 98. Within these ranges, the RAF value tends to be good indicator of water-soluble films having a good balance of physical properties (e.g., as represented by relatively high TS and/or MOD values) and chemical properties (e.g., as represented by relatively low DC residue values). Films having low RAF values outside the various ranges can exhibit relatively low DC residue values but also a relatively high degree of AMPS cleavage with its attendant disadvantages. Films having high RAF values outside the various ranges can exhibit relatively high DC residue values. In various embodiments, the water-soluble film has a RAF value of at least about 54, 55, 60, 70, 80, 85, 90, or 92 and/or up to about 95, 98, 99, or 100.

EXAMPLES

Comparative Examples 1-5

Single-Resin Films

Examples 1-5 represent water-soluble films which were formed, each including a single PVOH polymer or PVOH copolymer Resin A-E, respectively. Resins A and B were partially hydrolyzed PVOH polymers without anionic comonomers and having different 4% solution viscosities. Resin C was a partially hydrolyzed PVOH copolymer including a 1.82 mol. % level of incorporation of an anionic monomethyl maleate (sodium salt) comonomer (i.e., Resin C was a PVOH terpolymer with vinyl alcohol, vinyl acetate, and monomethyl maleate (sodium salt) monomer units). Resins D and E were partially hydrolyzed PVOH copolymers including 1.77 mol. % and 3.70 mol. % levels of incorporation, respectively, of an anionic 2-acrylamido-2-methylpropanesulfonic acid (sodium salt) comonomer (i.e., Resins D and E were PVOH terpolymers with vinyl alcohol, vinyl acetate, and 2-acrylamido-2-methylpropanesulfonic acid (sodium salt) monomer units). The films included (i) their respective resins (100 weight parts per hundred resin weight parts (phr)), (ii) glycerol plasticizer (about 20-22 phr), (iii) propylene glycol plasticizer (about 10-12 phr), (iv) sorbitol plasticizer (about 5-6 phr), (v) a modified starch filler (about 2-4 phr), (vi) surfactants and other process aids (about 5-7 phr), and (vii) residual water (about 9-10 phr). Aqueous compositions of the foregoing were cast to form 3.0±0.15 mil (or 76.2±3.8 μm) film samples, which were tested for their DC residue values, TS values, and MOD values by the above methods. Table 1 summarizes the resin and film properties for Examples 1-5. In Table 1, the anionic comonomer (AC) content for the films is provided on a molar basis relative to all of the PVOH resins in the film (i.e., excluding the plasticizers and the other non-resin components thereof), and the AC values further indicate whether they correspond to an AMPS comonomer unit (A) or a monomethyl maleate comonomer unit (M).

TABLE 1

Resin and Film Data for Comparative Examples 1-5

| | | Resin | | | Film | | | |
|---|---|---|---|---|---|---|---|---|
| Example | Type | μ (cP) | DH (%) | AC (mol. %) | DC (%) | TS (MPa) | MOD (N/mm$^2$) | AC (mol. %) |
| 1 | A | 12.5 | 86 | 0.00 | 60.2 | 32.91 | 10.82 | 0.00 |
| 2 | B | 23.5 | 87 | 0.00 | 60.6 | 33.44 | 12.04 | 0.00 |
| 3 | C | 23.5 | 92 | 1.82 (M) | 49.5 | 38.63 | 15.05 | 1.82 (M) |
| 4 | D | 24.3 | 88 | 1.77 (A) | 49.0 | 38.88 | 11.50 | 1.77 (A) |
| 5 | E | 12.0 | 99 | 3.70 (A) | 5.8 | 28.84 | 12.66 | 3.70 (A) |

Examples 6-11

Two-Resin Blend Films

Examples 6-11 represent water-soluble films which were formed, each including a blend of two of the PVOH polymer or PVOH copolymer Resins A-E. Specific blends included PVOH Resins A and E (Example 6), A and C (Example 7), A and D (Example 8), B and E (Example 9), A and B (Example 10), and C and E (Example 11). The blend films included 100 phr combined of the two resins forming a given blend in a range of relative weight proportions as set forth in Tables 2-7 below, while plasticizers and other additives were present in the amounts and types as described for Comparative Examples 1-5. Aqueous compositions of the foregoing blend film compositions were cast to form 3.0±0.15 mil (or 76.2±3.8 μm) film samples, which were tested for their DC residue values, TS values, and MOD values by the above methods. Tables 2-7 summarize the resin and film properties for Examples 6-11. The first and last entries for each of Tables 2-7 represent the single-resin limit for the film formulation (e.g., as similarly represented in Comparative Examples 1-5), while the remaining values represent the two-resin blend formulations. In Tables 2-7, the anionic comonomer (AC) content for the films is provided on a molar basis relative to all of the polymeric resin in the film (i.e., including both resins present but excluding the plasticizers and the other non-resin components thereof), and the AC values further indicate whether they correspond to an AMPS comonomer unit (A) or a monomethyl maleate comonomer unit (M).

TABLE 2

Resin and Film Data for Example 6 (A/E Blend)

| | Resins | | | Film | | | | |
|---|---|---|---|---|---|---|---|---|
| Example | Type | Amt. (phr) | Type | Amt. (phr) | DC (%) | TS (MPa) | MOD (N/mm$^2$) | AC (mol. %) | RAF (—) |
| 6 | A | 0 | E | 100 | 7.82* | 30.47 | 13.12* | 3.70 (A) | 52.6 |
| | A | 5 | E | 95 | 9.50* | 28.64 | 11.94 | 3.51 (A) | 54.1 |
| | A | 10 | E | 90 | 6.38* | 24.24 | 11.01 | 3.32 (A) | 46.0 |
| | A | 20 | E | 80 | 17.73* | 35.11* | 11.86 | 2.95 (A) | 64.9 |
| | A | 30 | E | 70 | 11.31* | 30.38 | 11.19 | 2.58 (A) | 48.4 |
| | A | 40 | E | 60 | 21.22* | 29.63 | 12.88* | 2.20 (A) | 64.5 |
| | A | 45 | E | 55 | 39.05* | 28.76 | 12.15* | 2.02 (A) | 98.3 |
| | A | 50 | E | 50 | 36.15* | 30.57 | 12.76* | 1.83 (A) | 90.6 |
| | A | 55 | E | 45 | 42.32* | 31.83 | 14.46* | 1.65 (A) | 101.1 |
| | A | 60 | E | 40 | 44.52* | 29.74 | 14.65* | 1.46 (A) | 103.7 |
| | A | 70 | E | 30 | 48.66 | 35.79* | 13.77* | 1.10 (A) | 108.3 |
| | A | 80 | E | 20 | 59.72 | 35.31* | 12.91* | 0.73 (A) | 126.7 |
| | A | 90 | E | 10 | 62.18 | 34.61* | 11.90 | 0.36 (A) | 128.0 |
| | A | 100 | E | 0 | 60.20 | 32.91 | 10.82 | 0.00 | 120.4 |

TABLE 3

Resin and Film Data for Example 7 (A/C Blend)

| | Resins | | | Film | | | | |
|---|---|---|---|---|---|---|---|---|
| Example | Type | Amt. (phr) | Type | Amt. (phr) | DC (%) | TS (MPa) | MOD (N/mm$^2$) | AC (mol. %) | RAF (—) |
| 7 | A | 0 | C | 100 | 50.08 | 34.43* | 13.27* | 1.82 (M) | 100.2 |
| | A | 30 | C | 70 | 53.59 | 32.49 | 12.73 | 1.28 (M) | 107.2 |
| | A | 40 | C | 60 | 60.41 | 34.10* | 15.72* | 1.10 (M) | 120.8 |
| | A | 45 | C | 55 | 58.23 | 32.19 | 14.03* | 1.01 (M) | 116.5 |
| | A | 50 | C | 50 | 58.36 | 28.70 | 13.09* | 0.91 (M) | 116.7 |
| | A | 55 | C | 45 | 54.85 | 32.19 | 15.17* | 0.82 (M) | 109.7 |
| | A | 60 | C | 40 | 61.39 | 26.80 | 12.61* | 0.73 (M) | 122.8 |
| | A | 70 | C | 30 | 56.58 | 26.79 | 12.33* | 0.55 (M) | 113.2 |
| | A | 80 | C | 20 | 63.04 | 31.21 | 14.99* | 0.37 (M) | 126.1 |
| | A | 90 | C | 10 | 61.40 | 30.27 | 12.07* | 0.18 (M) | 122.8 |
| | A | 100 | C | 0 | 60.20 | 32.91 | 10.82 | 0.00 | 120.4 |

TABLE 4

Resin and Film Data for Example 8 (A/D Blend)

| | Resins | | | Film | | | | |
|---|---|---|---|---|---|---|---|---|
| Example | Type | Amt. (phr) | Type | Amt. (phr) | DC (%) | TS (MPa) | MOD (N/mm$^2$) | AC (mol. %) | RAF (—) |
| 8 | A | 0 | D | 100 | 49.02 | 38.88* | 11.50 | 1.77 (A) | 115.7 |
| | A | 10 | D | 90 | 52.24 | 40.27* | 11.51 | 1.59 (A) | 120.3 |
| | A | 20 | D | 80 | 46.92* | 38.98* | 7.81 | 1.40 (A) | 107.9 |

TABLE 4-continued

Resin and Film Data for Example 8 (A/D Blend)

| | Resins | | | Film | | | | |
|---|---|---|---|---|---|---|---|---|
| Example | Type | Amt. (phr) | Type | Amt. (phr) | DC (%) | TS (MPa) | MOD (N/mm$^2$) | AC (mol. %) | RAF (—) |
| | A | 30 | D | 70 | 56.20 | 35.65* | 10.46 | 1.22 (A) | 124.6 |
| | A | 40 | D | 60 | 57.24 | 40.68* | 12.01* | 1.04 (A) | 124.9 |
| | A | 50 | D | 50 | 55.76 | 38.68* | 12.23* | 0.87 (A) | 120.2 |
| | A | 60 | D | 40 | 62.36 | 37.03* | 11.11 | 0.69 (A) | 131.6 |
| | A | 70 | D | 30 | 61.24 | 38.84* | 12.34* | 0.52 (A) | 127.6 |
| | A | 80 | D | 20 | 65.05 | 35.28* | 11.62 | 0.34 (A) | 133.5 |
| | A | 90 | D | 10 | 63.08 | 33.69* | 10.68 | 0.17 (A) | 127.9 |
| | A | 100 | D | 0 | 60.20 | 32.91 | 10.82 | 0.00 | 120.4 |

TABLE 5

Resin and Film Data for Example 9 (B/E Blend)

| | Resins | | | | Film | | | | |
|---|---|---|---|---|---|---|---|---|---|
| Example | Type | Amt. (phr) | Type | Amt. (phr) | DC (%) | TS (MPa) | MOD (N/mm$^2$) | AC (mol. %) | RAF (—) |
| 9 | B | 0 | E | 100 | 5.78* | 28.48 | 12.66* | 3.70 (A) | 48.6 |
| | B | 10 | E | 90 | 10.86* | 27.86 | 11.57 | 3.32 (A) | 54.9 |
| | B | 20 | E | 80 | 27.34* | 28.87 | 12.23* | 2.94 (A) | 84.1 |
| | B | 30 | E | 70 | 36.53* | 35.80* | 12.52* | 2.57 (A) | 98.7 |
| | B | 40 | E | 60 | 40.61* | 34.04* | 11.71 | 2.20 (A) | 103.2 |
| | B | 50 | E | 50 | 46.35* | 33.05* | 12.66* | 1.82 (A) | 110.9 |
| | B | 60 | E | 40 | 52.67 | 29.22 | 14.34* | 1.46 (A) | 119.9 |
| | B | 70 | E | 30 | 46.58* | 39.69* | 11.83 | 1.09 (A) | 104.0 |
| | B | 80 | E | 20 | 62.65 | 27.40 | 10.20 | 0.72 (A) | 132.5 |
| | B | 90 | E | 10 | 59.69 | 31.30 | 11.25 | 0.36 (A) | 123.0 |
| | B | 100 | E | 0 | 60.57 | 33.44* | 12.04* | 0.00 (A) | 121.1 |

TABLE 6

Resin and Film Data for Example 10 (A/B Blend)

| | Resins | | | | Film | | | | |
|---|---|---|---|---|---|---|---|---|---|
| Example | Type | Amt. (phr) | Type | Amt. (phr) | DC (%) | TS (MPa) | MOD (N/mm$^2$) | AC (mol. %) | RAF (—) |
| 10 | A | 100 | B | 0 | 60.20 | 32.91 | 10.82 | 0.00 | 120.4 |
| | A | 90 | B | 10 | 58.33 | 35.04* | 12.55* | 0.00 | 116.7 |
| | A | 80 | B | 20 | 62.96 | 30.26 | 9.53 | 0.00 | 125.9 |
| | A | 70 | B | 30 | 56.41 | 35.85* | 13.94* | 0.00 | 112.8 |
| | A | 60 | B | 40 | 61.34 | 36.23* | 12.41* | 0.00 | 122.7 |
| | A | 50 | B | 50 | 60.08 | 36.14* | 10.37 | 0.00 | 120.2 |
| | A | 40 | B | 60 | 65.02 | 38.17* | 12.99* | 0.00 | 130.0 |
| | A | 30 | B | 70 | 57.22 | 38.29* | 12.71* | 0.00 | 114.4 |
| | A | 20 | B | 80 | 65.17 | 36.89* | 13.26* | 0.00 | 130.3 |
| | A | 10 | B | 90 | 65.77 | 39.21* | 12.36* | 0.00 | 131.5 |
| | A | 0 | B | 100 | 60.57 | 33.44* | 12.04* | 0.00 | 121.1 |

TABLE 7

Resin and Film Data for Example 11 (C/E Blend)

| | Resins | | | | Film | | | | | |
|---|---|---|---|---|---|---|---|---|---|---|
| Example | Type | Amt. (phr) | Type | Amt. (phr) | DC (%) | TS (MPa) | MOD (N/mm$^2$) | AC (mol. %) | | RAF (—) |
| 11 | C | 0 | E | 100 | 6.43* | 30.03 | 12.52* | 0.00 (M) | 3.70 (A) | 49.9 |
| | C | 5 | E | 95 | 12.72* | 32.20 | 12.17* | 0.09 (M) | 3.51 (A) | 60.5 |
| | C | 10 | E | 90 | 4.92* | 29.10 | 13.46* | 0.19 (M) | 3.32 (A) | 43.0 |

TABLE 7-continued

Resin and Film Data for Example 11 (C/E Blend)

| | Resins | | | Film | | | | |
| --- | --- | --- | --- | --- | --- | --- | --- | --- |
| Example | Type | Amt. (phr) | Type | Amt. (phr) | DC (%) | TS (MPa) | MOD (N/mm$^2$) | AC (mol. %) | RAF (—) |
| | C | 15 | E | 85 | 9.90* | 31.98 | 13.14* | 0.28 (M) 3.13 (A) | 51.1 |
| | C | 20 | E | 80 | 12.83* | 29.89 | 13.10* | 0.37 (M) 2.94 (A) | 55.1 |
| | C | 25 | E | 75 | 14.48* | 36.65* | 13.19* | 0.47 (M) 2.75 (A) | 56.5 |
| | C | 30 | E | 70 | 16.19* | 34.71* | 13.25* | 0.56 (M) 2.57 (A) | 58.1 |
| | C | 35 | E | 65 | 19.93* | 37.30* | 14.27* | 0.65 (M) 2.38 (A) | 63.7 |
| | C | 40 | E | 60 | 18.03* | 38.52* | 15.40* | 0.74 (M) 2.19 (A) | 58.0 |
| | C | 45 | E | 55 | 22.88* | 39.52* | 15.62* | 0.83 (M) 2.01 (A) | 65.8 |
| | C | 50 | E | 50 | 17.93* | 33.48* | 15.02* | 0.92 (M) 1.82 (A) | 54.1 |
| | C | 60 | E | 40 | 35.71* | 34.58* | 14.02* | 1.10 (M) 1.45 (A) | 86.0 |
| | C | 70 | E | 30 | 36.88* | 35.48* | 13.53* | 1.29 (M) 1.09 (A) | 84.6 |
| | C | 80 | E | 20 | 43.33* | 35.21* | 12.96* | 1.46 (M) 0.72 (A) | 93.9 |
| | C | 90 | E | 10 | 46.77* | 37.79* | 14.45* | 1.64 (M) 0.36 (A) | 97.1 |
| | C | 100 | E | 0 | 49.48 | 38.63* | 15.05* | 1.82 (M) 0.00 (A) | 99.0 |

Examples 6-11 illustrate that water-soluble films including PVOH resin blends with at least some PVOH anionic copolymer can exhibit a combination of substantially advantageous, yet competing, physical and chemical properties when the PVOH resin blends are selected in view of their particular blend constituents, the relative amounts of the blend constituents, or both. For example, as noted above, films that are particularly suitable for composition-in-pouch delivery applications exhibit at least one of (a) a DC residue value of about 48 wt. % or less to reduce or eliminate film residue on articles in washing applications, (b) a TS value of at least about 33 MPa to create strong pouch seals less likely to rupture prematurely during storage or washing, and (c) a MOD value of at least about 12 N/mm$^2$ to create stiff pouches less likely to deform and/or stick together prior to use. Desirably, a film meets the DC residue criteria (a) and at least one of the TS/MOD criteria (b), (c). More desirably, a film meets all three criteria (a)-(c).

As illustrated in the single-resin film data of Comparative Examples 1-5, however, desirable DC values are often in competition with desirable TS and/or MOD values. For example, the film of Comparative Example 5 (Resin E) had a desirably low DC residue value but a poor TS value. Conversely, the films of Comparative Examples 1-4 (Resins A-D) have improved TS values but poor DC residue values. Because each of the single-resin films in Comparative Examples 1-5 fail at least one of the three criteria (a)-(c), it was not known a priori whether PVOH resin blend films could be obtained with favorable properties for at least two and preferably each of the three criteria (a)-(c).

As shown in Examples 6-11, it unexpectedly has been found that certain water-soluble films containing PVOH resin blends with at least one PVOH anionic copolymer meet two or three of the criteria (a)-(c). In Tables 2-7, film properties marked with an "*" satisfy their respective threshold levels. From the data, it is seen that PVOH resin blends including two PVOH anionic copolymers, as exemplified by the C/E blends of Example 11, generally meet all three criteria (a)-(c) for C/E blend ratios ranging from about 25/75 to about 90/10 (w/w, respectively). Similarly, it is seen that PVOH resin blends including a PVOH anionic copolymer and a PVOH homopolymer, as exemplified by the A/E and B/E blends of Examples 6 and 9, respectively, generally meet at least two of the criteria (a)-(c) for A/E and B/E blend ratios ranging from about 30/70 to about 70/30 (w/w, respectively).

Although the range of C/E blends of about 25/75 to about 90/10 yields a superior combination of physical and chemical properties, it was recognized that it would be more preferable if the three criteria (a)-(c) also could be achieved with a lower levels of AMPS in film blend. Further surprisingly, it was observed that even with a reduction of the AMPS to less than about 1.6 mol. % as a fourth criterion (d), all four criteria (a)-(d) could be satisfied for C/E blend ratios ranging from about 60/40 to about 40/90 (w/w, respectively) as shown in Example 11.

Examples 6-11 further illustrate the value of the RAF value as a selection indicator of water-soluble films having a desirable combination of physical and chemical properties as reflected by the three criteria (a)-(c). For example, for films having RAF values ranging from about 54 to about 100, it was found that 90.5% of the example films (19/21 of blend films tested) met criterion (a) and at least one of criteria (b) and (c). Similarly, for films having RAF values outside the range of about 54 to about 100, it was found that 78.0% of the example films (32/41 of blend films tested) did not meet criterion (a) and at least one of criteria (b) and (c), and none of the example films met all three criteria (a)-(c). The narrower RAF range from about 85 to about 98 was indicative of even more preferred films, especially those meeting all four criteria (a)-(d) (i.e., further meeting the low-AMPS criterion of less than about 1.6 mol. %), thus reducing the likelihood of AMPS group scission and film deterioration. In this case, for films having RAF values ranging from about 85 to about 98, it was found that 100% of the example films (4/4 of blend films tested) met all four criteria (a)-(d). Similarly, for films having RAF values outside the range of about 85 to about 98, it was found that 100% of the example films (58/58 of blend films tested) failed to meet all four criteria (a)-(d).

Example 16

Two-Resin Blend Films

Example 16 represents a series of water-soluble films based on a blend of PVOH copolymers and three different plasticizers, including glycerin, sorbitol, and dipropylene glycol. The PVOH copolymer blend is a variable-ratio blend of a first partially hydrolyzed PVOH copolymer including monomethyl maleate (sodium salt) comonomer (MMM) and a second partially hydrolyzed PVOH copolymer including an acrylamido methylpropanesulfonic acid (sodium salt) comonomer (AMPS). The films included (i) their respective PVOH copolymer resins (100 weight parts per hundred resin weight parts (phr)), (ii) glycerin plasticizer (16.2 phr), (iii) sorbitol plasticizer (10.4 phr), (iv) dipropylene glycol plasticizer (10.4 phr), (v) a modified starch filler (about 2-4 phr), (vi) surfactants and other process aids (about 5-7 phr), and (vii) residual water. Total plasticizer loading was 37 phr. The amount of PVOH-co-MMM in the copolymer blend ranged from 0 wt. % to 100 wt. %. Aqueous compositions of the foregoing were cast to form 3.0±0.15 mil (or 76.2±3.8 μm) film samples, which were tested for their ATS values, AA values, AMTD values, SST values by the above methods. Table 8 summarizes the film properties for Example 16, and it shows that films including the PVOH copolymer blend achieve a combination of favorable properties over a range of copolymer blend compositions.

TABLE 8

Film Data for Example 16

| Film | PVOH-co-MMM (wt. %) | PVOH-co-AMPS (wt. %) | ATS (MPa) | SST (%) | AMTD (° C.) | AA (g/s) |
|---|---|---|---|---|---|---|
| 1 | 0 | 100 | 17.5 | 0 | 10.3 | 1055 |
| 2 | 80 | 20 | 25.5 | 60 | 11.92 | 1406 |
| 3 | 50 | 50 | 25.4 | 0 | 7.84 | 759 |
| 4 | 20 | 80 | 22.1 | 0 | 9.12 | 611 |
| 5 | 100 | 0 | 26.8 | 20 | 16.4 | 1677 |

Figure 2:
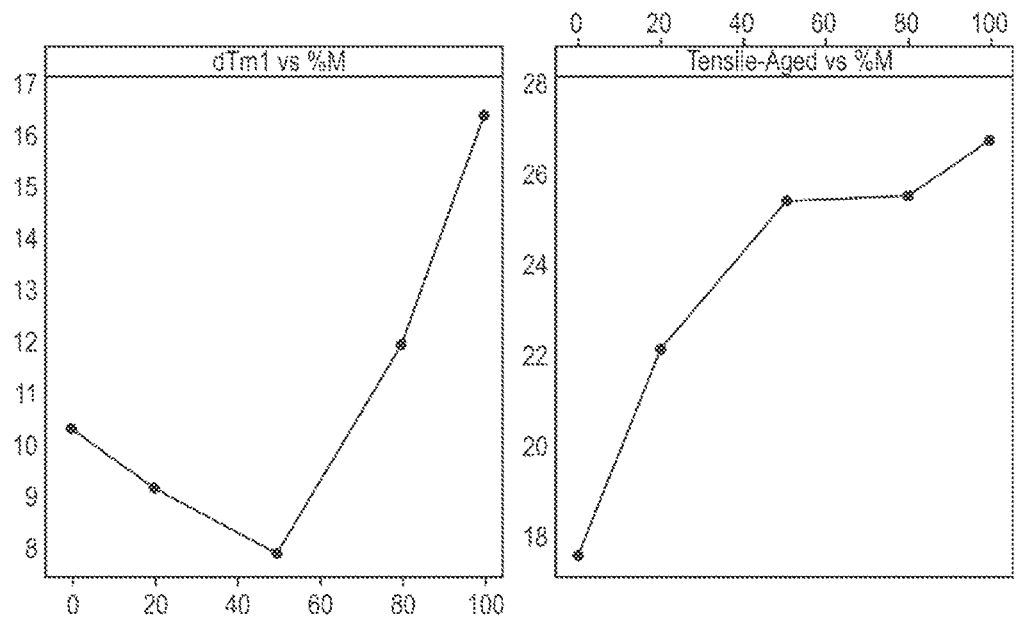
FIG. 2 includes graphs showing Aged Melting Transition Delta values and Aged Tensile Strength values for PVOH copolymer blend films according to the disclosure incorporating a blend of different plasticizers including dipropylene glycol, sorbitol, and glycerin.
Figure 3:
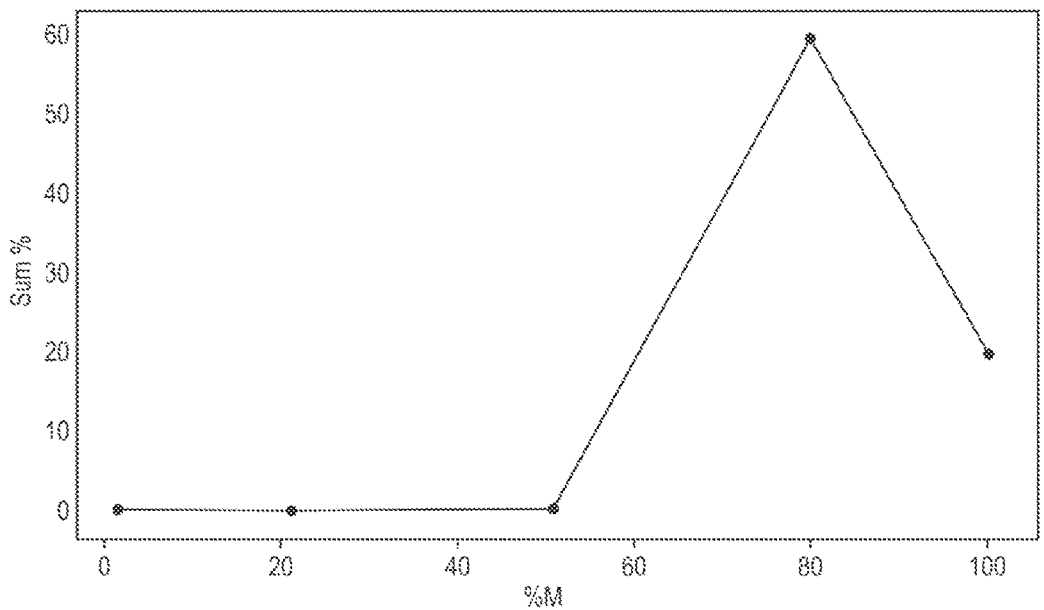
FIG. 3 includes a graph showing Sum Seal Tears values for PVOH copolymer blend films according to the disclosure incorporating a blend of different plasticizers including dipropylene glycol, sorbitol, and glycerin.

FIG. 2 of Example 16 shows that the response of both the AMTD values and the ATS values is non-linear as function of PVOH-co-MMM (% M) content. This non-linear response is a substantially favorable deviation relative to a linearly interpolated baseline from the Rule-of Mixtures (ROM). There is a substantial decrease in the AMTD value over a range of about 20 wt. % to 80 wt. % PVOH-co-MMM and there is a substantial increase in the ATS value over a range of about 20 wt. % to 50 wt. % PVOH-co MMM. FIG. 3 of Example 16 shows that the 80 wt. %/20 wt. % blend of PVOH-co-MMM/PVOH-co-AMPS shows a surprisingly good SST value compared to all other ratios tested. Although the SST value of 60% is lower compared to the maximum possible 200% SST value, the 80 wt. %/20 wt. % blend stands out for relatively good performance in the series of Example 16.

Example 17

Illustrative Compositions

Tables 9-15 show illustrative compositions that may comprise the articles described herein. For example, the compositions below, which are intended to be non-limiting examples, may be encapsulated in the water-soluble films described herein, for example in a pouch.

A bleach additive may include the ingredients presented in Table 9.

TABLE 9

|  | A Wt. % |
|---|---|
| Sodium Percarbonate | 25 |
| Bleach activator[1] | 7 |
| Sodium Carbonate | 15 |
| Sodium Citrate | 10 |
| Zeolite | 10 |
| Sodium Sulfate | 15 |
| Enzymes | 2 |
| Optical brighteners | 2 |
| Miscellaneous | To 100 |

[1]Tetraacetyl ethylene diamine

Granular laundry detergents may include the ingredients presented in Table 10.

TABLE 10

|  | B (wt %) | C (wt %) | D (wt %) | E (wt %) | F (wt %) | G (wt %) |
|---|---|---|---|---|---|---|
| Linear alkylbenzenesulfonate | 8 | 7.1 | 7 | 6.5 | 7.5 | 7.5 |
| AE3S | 0 | 4.8 | 0 | 5.2 | 4 | 4 |
| C12-14 Alkylsulfate | 1 | 0 | 1 | 0 | 0 | 0 |
| AE7 | 2.2 | 0 | 3.2 | 0 | 0 | 0 |
| $C_{10-12}$ Dimethyl hydroxyethylammonium chloride | 0.75 | 0.94 | 0.98 | 0.98 | 0 | 0 |
| Crystalline layered silicate ($\delta$-$Na_2Si_2O_5$) | 4.1 | 0 | 4.8 | 0 | 0 | 0 |
| Zeolite A | 5 | 0 | 5 | 0 | 2 | 2 |
| Citric Acid | 3 | 5 | 3 | 4 | 2.5 | 3 |
| Sodium Carbonate | 15 | 20 | 14 | 20 | 23 | 23 |
| Silicate 2R ($SiO_2$:$Na_2O$ at ratio 2:1) | 0.08 | 0 | 0.11 | 0 | 0 | 0 |
| Soil release agent | 0.75 | 0.72 | 0.71 | 0.72 | 0 | 0 |
| Acrylic Acid/Maleic Acid Copolymer | 1.1 | 3.7 | 1.0 | 3.7 | 2.6 | 3.8 |

TABLE 10-continued

|  | B (wt %) | C (wt %) | D (wt %) | E (wt %) | F (wt %) | G (wt %) |
|---|---|---|---|---|---|---|
| Carboxymethylcellulose | 0.15 | 1.4 | 0.2 | 1.4 | 1 | 0.5 |
| Protease - Purafect ® (84 mg active/g) | 0.2 | 0.2 | 0.3 | 0.15 | 0.12 | 0.13 |
| Amylase - Stainzyme Plus ® (20 mg active/g) | 0.2 | 0.15 | 0.2 | 0.3 | 0.15 | 0.15 |
| Lipase - Lipex ® (18.00 mg active/g) | 0.05 | 0.15 | 0.1 | 0 | 0 | 0 |
| Amylase - Natalase ® (8.65 mg active/g) | 0.1 | 0.2 | 0 | 0 | 0.15 | 0.15 |
| Cellulase - Celluclean ™ (15.6 mg active/g) | 0 | 0 | 0 | 0 | 0.1 | 0.1 |
| TAED | 3.6 | 4.0 | 3.6 | 4.0 | 2.2 | 1.4 |
| Percarbonate | 13 | 13.2 | 13 | 13.2 | 16 | 14 |
| Na salt of Ethylenediamine-N,N'-disuccinic acid, (S,S) isomer (EDDS) | 0.2 | 0.2 | 0.2 | 0.2 | 0.2 | 0.2 |
| Hydroxyethane di phosphonate (HEDP) | 0.2 | 0.2 | 0.2 | 0.2 | 0.2 | 0.2 |
| $MgSO_4$ | 0.42 | 0.42 | 0.42 | 0.42 | 0.4 | 0.4 |
| Perfume | 0.5 | 0.6 | 0.5 | 0.6 | 0.6 | 0.6 |
| Suds suppressor agglomerate | 0.05 | 0.1 | 0.05 | 0.1 | 0.06 | 0.05 |
| Soap | 0.45 | 0.45 | 0.45 | 0.45 | 0 | 0 |
| Sulphonated zinc phthalocyanine (active) | 0.0007 | 0.0012 | 0.0007 | 0 | 0 | 0 |
| S-ACMC | 0.01 | 0.01 | 0 | 0.01 | 0 | 0 |
| Direct Violet 9 (active) | 0 | 0 | 0.0001 | 0.0001 | 0 | 0 |
| Sulfate/Water & Miscellaneous |  |  | Balance to 100 |  |  |  |

Liquid laundry detergents may include the ingredients presented in Table 11.

TABLE 11

|  | H Wt. % | I Wt. % | J Wt. % | K Wt. % | L Wt. % | M Wt. % |
|---|---|---|---|---|---|---|
| Glycerol | 3 | 5 | 6.1 | 0.6 | 5 | 5.3 |
| 1,2 Propanediol | 16 | 14 | 15.9 |  | 12 | 10 |
| Citric acid | 1 |  | 1.2 |  | 0.5 | 0.5 |
| Isopropanol |  |  |  | 7.7 |  |  |
| NaOH | 0.5 |  |  |  | 1 |  |
| Marlipal $C_{12-14}EO_7$ | 22 |  | 11.8 |  | 14 | 20.1 |
| $C_{13-15}EO_9$ | 1 | 15 |  |  |  |  |
| $C_{9-11}EO_9$ |  |  |  | 72 |  |  |
| Linear alkyl benzene sulfonic acid[1] | 16 | 25 | 14.5 |  | 23 | 24.6 |
| $C_{12-18}$ Fatty acid | 16 | 5 | 12.5 |  | 6 | 16.4 |
| $C_{12-14}$ alkyl ethoxy 3 sulfate |  |  | 11.1 |  | 9 |  |
| Enzymes | 2.5 | 1.5 | 1.3 | 2.0 | 1.5 | 2.0 |
| Polyethyleneimine ethoxylate PEI 600 E20 | 2 |  | 5.0 |  |  | 3.0 |
| Diethylenetriamine Pentaacetic Acid |  | 0.9 |  |  | 1 |  |
| Dequest 2010 | 1.5 |  |  |  | 1 | 1.1 |
| Optical brightening agent | 1 | 1.2 | 2.5 | 0.5 |  | 0.2 |
| $MgCl_2$ |  |  | 0.7 |  |  | 0.2 |
| Potassium sulfite |  |  | 0.5 |  | 0.35 | 0.2 |
| Structurant |  | 0.21 | 0.13 |  | 0.15 |  |
| Silicone softening agent (PDMS) |  |  |  |  |  | 2.5 |
| Water | 8 | 10 | 7 | 6 | 9 |  |
| Miscellaneous (dyes, aesthetics, perfume etc) | To 100 | To 100 | To 100 | To 100 | To 100 |  |
| Monoethanol amine | To pH 7.6 | To pH 7.5 | To pH 7.4 | To pH 7.6 | To pH 7.6 | To pH 7.6 |

[1]Preferred LAS also comprise an alkyl group comprising from about 9 to about 15 carbon atoms, in straight chain configuration.

The detergents may include the formulation presented in Table 12.

TABLE 12

|  | N Wt. % |
|---|---|
| Dimethyl monoethyl ether | 73.87 |
| Sodium lauryl sulfate | 6.00 |

TABLE 12-continued

|  | N Wt. % |
|---|---|
| Dimethyl glyoxime | 1.00 |
| Isopropyl alcohol | 0.5 |
| Triazine stilbene (Tinopal UNPA-GX) | 0.4 |
| Monoethanol amine | 1.52 |

TABLE 12-continued

|  | N Wt. % |
|---|---|
| Linear alcohol ethoxylate (Surfonic LF-17) | 13.61 |
| d-limonene | 3.00 |

The composition may include the formulation presented in Table 13.

TABLE 13

|  | O Wt. % | P Wt. % |
|---|---|---|
| Cationic Softener Active[1] | 65.0 | 65.0 |
| Fatty Acid[2] | 1.8 | 1.8 |
| TMPD[3] | 14.7 | 14.7 |
| Cocoamide 6EO[4] | 4.05 | 4.05 |
| Perfume | 5 | 2.5 |

TABLE 13-continued

|  | O Wt. % | P Wt. % |
|---|---|---|
| Perfume Microcapsules | — | 1.25 |
| Dye | 0.001 | 0.001 |
| Hexylene Glycol[6] | 5.63 | 5.6 |
| Ethanol[6] | 5.63 | 5.6 |

[1]Di(acyloxyethyl)(2-hydroxy ethyl) methyl ammonium methyl sulfate wherein the acyl group is derived from partially hydrogenated canola fatty acid.
[2]Partially hydrogenated canola fatty acid.
[3]2,2,4-trimethyl-1,3-pentanediol
[4]PEG 6 cocamide - polyethylene glycol amide of coconut fatty acid.
[5] Sodium salt of hydroxyethane diphosphonic acid
[6]Material included with softening active by supplier.

Multi compartment pouches may contain a plurality of benefit agents. By way of a non-limiting example, a two- or three-component pouch can contain the formulations presented in Table 14 in separate enclosures, where dosage is the amount of the formulation in the respective enclosure.

TABLE 14

|  | Q 3 compartments | | | R 2 compartments | | S 3 compartments | | |
|---|---|---|---|---|---|---|---|---|
| Compartment # | 1 | 2 | 3 | 1 | 2 | 1 | 2 | 3 |
| Dosage (g) | 34.0 | 3.5 | 3.5 | 30.0 | 5.0 | 25.0 | 1.5 | 4.0 |
| Ingredients | Weight % | | | | | | | |
| Alkylbenzene sulfonic acid | 20.0 | 20.0 | 20.0 | 10.0 | 20.0 | 20.0 | | |
| Alkyl sulfate |  |  |  | 2.0 |  |  |  |  |
| C12-14 alkyl 7-ethoxylate | 17.0 | 17.0 | 17.0 |  | 17.0 | 17.0 | | |
| Cationic surfactant |  |  |  | 1.0 |  |  |  |  |
| Zeolite A |  |  |  | 10.0 |  |  |  |  |
| C12-18 Fatty acid | 13.0 | 13.0 | 13.0 |  | 18.0 | 18.0 | | |
| Sodium acetate |  |  |  | 4.0 |  |  |  |  |
| enzymes | 0-3 | 0-3 | 0-3 | 0-3 |  | 0-3 | | |
| Sodium Percarbonate |  |  |  | 11.0 |  |  |  |  |
| TAED |  |  |  | 4.0 |  |  |  |  |
| Organic catalyst[1] |  |  |  | 1.0 |  |  |  |  |
| PAP granule[2] |  |  |  |  |  |  |  | 50 |
| Polycarboxylate |  |  |  | 1.0 |  |  |  |  |
| Polyethyleneimine ethoxylate[3] | 2.2 | 2.2 | 2.2 |  |  |  |  |  |
| Hydroxyethane diphosphonic acid | 0.6 | 0.6 | 0.6 | 0.5 |  |  |  |  |
| Ethylene diamine tetra(methylene phosphonic) acid |  |  |  |  |  | 0.4 | | |
| Brightener | 0.2 | 0.2 | 0.2 | 0.3 |  | 0.3 | | |
| Mineral oil |  |  |  |  |  |  |  |  |
| Hueing dye[4] |  | 0.05 |  | 0.035 |  | 0.12 | | |
| Perfume | 1.7 | 1.7 |  | 0.6 |  | 1.5 | | |
| Water and minors (antioxidant, aesthetics, . . . ) | 10.0 | 10.0 | 10.0 | 4.0 |  |  |  |  |
| Buffers (sodium carbonate, monoethanolamine)[5] | To pH 8.0 for liquids | | | | | | | |
|  | To RA >5.0 for powders | | | | | | | |
| Solvents (1,2 propanediol, ethanol) for liquids, sodium sulfate for powders | To 100% | | | | | | | |

[1]Sulfuric acid mono-[2-(3,4-dihydro-isoquinolin-2-yl)-1-(2-ethyl-hexyloxymethyl)-ethyl]ester as described in U.S. Pat. No. 7,169,744
[2]PAP = Phtaloyl-Amino-Peroxycaproic acid, as a 70% active wet cake
[3]Polyethylenimine (MW = 600) with 20 ethoxylate groups per —NH.
[4]Ethoxylated thiophene, EO ($R_1 + R_2$) = 5
[5]RA = Reserve Alkalinity (g NaOH/dose)

In another embodiment of multicomponent pouches, the respective enclosures can be filled with liquid and solid benefit agents. Non-limiting examples of two compartment pouches, where one enclosure is filled with a liquid and one is filled with a solid, include combinations of the formulations presented in Tables 15 and 16.

TABLE 15

|  | T | U | V | W |
|---|---|---|---|---|
|  | \multicolumn{4}{c}{Liquid formulation} | | | |
|  | XL1 | XL2 | XL3 | XL4 |
|  | \multicolumn{4}{c}{Dosage} | | | |
|  | 10 g | 5 g | 15 g | 7 |
|  | Wt % | Wt % | Wt % | Wt % |
| Marlipal C24-7 | 74 |  | 20 | 14 |
| Non ionic surfactant Neodol 23-5 |  | 55 |  |  |
| Anionic surfactant[1] |  | 20 | 20 | 25 |
| Propane diol | 10 | 4 | 22 | 10 |
| Glycerol | 2 | 5 | 5 |  |
| Soil dispersant[2] |  | 2 |  |  |
| Amphiphilic alkoxylated grease cleaning polymer[3] |  |  | 5 |  |
| Fatty acid |  |  | 10 | 20 |
| Enzymes |  |  |  | 3 |
| Structurant |  |  | 3 |  |
| Perfume | 7 | 10 |  |  |
| Water | 2 | 3 | 5 |  |
| Monoethanol amine |  | \multicolumn{3}{c}{To pH 7.5} | | |
| Minors |  | \multicolumn{3}{c}{To 100%} | | |

[1] Linear C11-13 alkyl benzene sulfonic acid
[2] $(bis(C_2H_5O)(C_2H_4O)_n)(CH_3)—N^+—C_xH_{2x}—N^+—(CH_3)\text{-}bis((C_2H_5O)(C_2H_4O)_n)$, wherein n = from 15 to 30, and x = from 3 to 8.
[3] Random graft copolymer is a polyvinyl acetate grafted polyethylene oxide copolymer having a polyethylene oxide backbone and multiple polyvinyl acetate side chains. The molecular weight of the polyethylene oxide backbone is about 6000 and the weight ratio of the polyethylene oxide to polyvinyl acetate is about 40 to 60 and no more than 1 grafting point per 50 ethylene oxide units.

TABLE 16

|  | X | Y | Z | AA |
|---|---|---|---|---|
|  | \multicolumn{4}{c}{Powder formulation} | | | |
|  | XP1 | XP2 | XP3 | XP4 |
|  | \multicolumn{4}{c}{Dosage} | | | |
|  | 35 g | 25 g | 40 g | 30 g |
|  | Wt % | Wt % | Wt % | Wt % |
| Anionic surfactant |  | 20 | 20 | 20 |
| Cationic surfactant |  |  | 1.5 | 1.5 |
| Bleach agent | 20 | 36 | 36 | 36 |
| Chelating agent | 0.8 | 2 | 2 | 2 |
| Enzyme |  | 10 | 10 | 10 |
| Sodium carbonate |  | 6 | 4 | 4 |
| Sodium bicarbonate |  |  | 4 | 4 |
| Zeolite | 40 | 20 | 15 | 15 |
| Fluorescent whitening agent | 0.5 | 3 |  | 1 |
| Polymers | 2 |  | 5 | 5 |
| Sodium sulfate | 15 |  |  |  |
| Minors | \multicolumn{4}{c}{To 100%} | | | |

A hard surface cleaning composition, which may be used by professionals, can include the formulation presented in Table 17.

TABLE 17

| Ingredient Name | WT % |
|---|---|
| C10 alkyl alcohol -8-ethoxylate | 55.0 |
| Linear alkylbenzene sulfonic acid | 9.0 |
| Monoethanolamine | 2.4 |
| 1,2 propanediol | 9.0 |

TABLE 17-continued

| Ingredient Name | WT % |
|---|---|
| Glycerol | 7.5 |
| C1218 alkyl fatty acid | 2.5 |
| Dye | 0.1 |
| Perfume | 2.2 |
| Water | Balance |

The foregoing description is given for clearness of understanding only, and no unnecessary limitations should be understood therefrom, as modifications within the scope of the invention may be apparent to those having ordinary skill in the art.

Throughout this specification and the claims which follow, unless the context requires otherwise, the word "comprise" and variations such as "comprises" and "comprising" will be understood to imply the inclusion of a stated integer or step or group of integers or steps but not the exclusion of any other integer or step or group of integers or steps.

Throughout the specification, where compositions are described as including components or materials, it is contemplated that the compositions can also consist essentially of, or consist of, any combination of the recited components or materials, unless described otherwise. Likewise, where methods are described as including particular steps, it is contemplated that the methods can also consist essentially of, or consist of, any combination of the recited steps, unless described otherwise. The invention illustratively disclosed herein suitably may be practiced in the absence of any element or step which is not specifically disclosed herein.

The practice of a method disclosed herein, and individual steps thereof, can be performed manually and/or with the aid of or automation provided by electronic equipment. Although processes have been described with reference to particular embodiments, a person of ordinary skill in the art will readily appreciate that other ways of performing the acts associated with the methods may be used. For example, the order of various of the steps may be changed without departing from the scope or spirit of the method, unless described otherwise. In addition, some of the individual steps can be combined, omitted, or further subdivided into additional steps.

All patents, publications and references cited herein are hereby fully incorporated by reference. In case of conflict between the present disclosure and incorporated patents, publications and references, the present disclosure should control.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to the term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed:

1. An article comprising:
   a. a water-soluble film comprising:
   a polyvinyl alcohol (PVOH) resin blend comprising:
   from about 10 wt. % to about 75 wt. % of the polyvinyl alcohol (PVOH) resin blend of a first PVOH terpolymer comprising a first anionic monomer unit, the first PVOH terpolymer having a first level of incorporation ($a_1$) of the first anionic monomer unit, wherein the first anionic monomer is selected from the group consisting of acrylamido methylpropanesulfonic acids, alkali metal salts thereof, and combinations thereof, and wherein the first PVOH terpolymer comprises monomer units of vinyl alcohol, vinyl acetate and acrylamido methylpropanesulfonic acid or alkali metal salt thereof; and
   from about 25 wt. % to about 90 wt. % of the polyvinyl alcohol (PVOH) resin blend of a second PVOH terpolymer comprising a second anionic monomer unit, the second PVOH terpolymer having a second level of incorporation ($a_2$) of the second anionic monomer unit, wherein the second anionic monomer is selected from the group consisting of monomethyl maleate, alkali metal salts thereof, and combinations thereof, and wherein the second PVOH terpolymer comprises monomer units of vinyl alcohol, vinyl acetate and monomethyl maleate or alkali metal salt thereof; and
   b. a household care composition proximal to the water-soluble film.

2. The article of claim 1, wherein the first anionic monomer unit and the second anionic monomer unit are together present in a combined amount in a range of about 2.0 mol. % to about 3.5 mol. % of the polyvinyl alcohol (PVOH) resin blend.

3. The article of claim 1, wherein the first anionic monomer is present in an amount less than about 3 mol. % of the polyvinyl alcohol (PVOH) resin blend.

4. The article of claim 1, wherein:
   the first PVOH terpolymer is present in an amount in a range from about 10 wt. % to about 40 wt. % of the polyvinyl alcohol (PVOH) resin blend;
   the second PVOH terpolymer is present in an amount in a range of about 60 wt.% to about 90 wt. % of the polyvinyl alcohol (PVOH) resin blend;
   $a_1 a_2$ is in a range of about 1 mol. % to about 3 mol. %
   $a_1$ is in a range of about 3 mol. % to about 5 mol. %;
   $a_2$ is in a range of about 1 mol. % to about 3 mol. %; and
   the first anionic monomer unit and the second anionic monomer unit are present in a combined amount in a range of about 2.0 mol. % to about 2.8 mol. % of the polyvinyl alcohol (PVOH) resin blend.

5. The article of claim 1, wherein the water-soluble film is characterized by at least one of the following values:
   a) a residue value of about 48 wt. % or less as measured by the Dissolution Chamber Test;
   b) an average tensile strength value of at least about 33 MPa as measured by the Tensile Strength Test;
   c) a modulus value of at least about 12 N/mm$^2$ as measured by the Modulus Test;
   d) a Residue-AMPS Factor (RAF) value in a range of about 55 to about 100;
   the RAF value is defined as RAF =(2 ×DC)+(10 ×A);
   DC is the residue value in weight percent of the film as measured by the Dissolution Chamber Test; and
   A is the level of incorporation in mole percent of all acrylamido methylpropanesulfonic acid anionic polymerized monomers relative to the polyvinyl alcohol (PVOH) resin blend.

6. The article of claim 1, wherein the first PVOH terpolymer and the second PVOH terpolymer each independently have a degree of hydrolysis in a range of about 75% to about 99%.

7. The article of claim 1, wherein the first PVOH terpolymer has a 4% solution viscosity at 20° C. in a range of about 4 cP to about 24 cP, and the second PVOH terpolymer has a 4% solution viscosity at 20° C. in a range of about 12 cP to about 30 cP.

8. The article of claim 1, wherein the water-soluble film further comprises at least a third water-soluble polymer selected from the group consisting of polyethyleneimines, polyvinyl pyrrolidones, polyalkylene oxides, polyacrylamides, cellulose ethers, cellulose esters, cellulose amides, polyvinyl acetates, polyamides, gelatines, methylcelluloses, carboxymethylcelluloses and salts thereof, dextrins, ethylcelluloses, hydroxyethyl celluloses, hydroxypropyl methylcelluloses, maltodextrins, starches, modified starches, guar gum, gum Acacia, xanthan gum, carrageenan, polyacrylates and salts thereof, copolymers thereof, and combinations thereof.

9. The article of claim 1, wherein the water-soluble film further comprises components selected from the group consisting of plasticizers, plasticizer compatibilizers, lubricants, release agents, fillers, extenders, cross-linking agents, antiblocking agents, antioxidants, detackifying agents, antifoams, nanoparticles, bleaching agents, surfactants, and combinations thereof.

10. The article of claim 1, wherein the water-soluble film further comprises one or more plasticizers in an amount in a range of about 1 wt. % to about 40 wt. % of the film.

11. The article of claim 1, wherein the article is in the form of a pouch comprising at least one sealed compartment.

12. The article of claim 11, wherein a second compartment is superposed on a first compartment.

13. The article of claim 11, where the household care composition is contained in the at least one sealed compartment.

14. The article of claim 1, wherein the household care composition is selected from the group consisting of light duty liquid detergents compositions, heavy duty liquid detergent compositions, hard surface cleaning compositions, detergent gels, bleaching compositions, laundry additives, fabric enhancer compositions, shampoos, body washes, personal care compositions, and mixtures thereof.

15. The article of claim 1, wherein the household care composition comprises surfactant.

16. The article of claim 1, wherein the household care composition is in the form of a liquid, solid, a powder, or mixtures thereof.

17. A method of forming the article of claim 1, where the method comprises the steps of:
   providing the film, wherein the film defines an interior pouch container volume;
   filling the container volume with a household care composition; and
   sealing the film to form a sealed compartment, wherein the sealed compartment contains the composition.

18. A method of treating a substrate, where the method comprises the step of contacting the substrate with the article of claim 1.

19. An article comprising:
a. a water-soluble film comprising:
  a polyvinyl alcohol (PVOH) resin blend comprising:
    from about 10 wt. % to about 75 wt. % of the polyvinyl alcohol (PVOH) resin blend of a first PVOH terpolymer comprising a first anionic monomer unit, wherein the first anionic monomer is selected from the group consisting of acrylamido methylpropanesulfonic acids, alkali metal salts thereof, and combinations thereof, and wherein the first PVOH terpolymer comprises monomer units of vinyl alcohol, vinyl acetate and acrylamido methylpropanesulfonic acid or alkali metal salt thereof; and
    from about 25 wt. % to about 90 wt. % of the polyvinyl alcohol (PVOH) resin blend of a second PVOH terpolymer comprising a second anionic monomer unit, wherein the second anionic monomer is selected from the group consisting of monomethyl maleate, alkali metal salts thereof, and combinations thereof, and wherein the second PVOH terpolymer comprises monomer units of vinyl alcohol, vinyl acetate and monomethyl maleate or alkali metal salt thereof;
  wherein the water-soluble film has the following properties
    (a) the water-soluble film has a residue value of from about 12 wt. % to about 48 wt. %, as measured by the Dissolution Chamber Test;
    (b) the water-soluble film has an average tensile strength value of at least about 33 MPa as measured by the Tensile Strength Test; and
    (c) the water-soluble film has a modulus value of at least about 12 N/mm$^2$ as measured by the Modulus Test; and
b. a household care composition proximal to the film.

20. The article of claim 19, wherein:
the water-soluble film has a residue value in a range of about 35 wt. % to about 48 wt. % as measured by the Dissolution Chamber Test;
the water-soluble film has an average tensile strength value in a range of about 33 MPa to about 38 MPa as measured by the Tensile Strength Test; and
the water-soluble film has a modulus value in a range of about 12.5 N/mm$^2$ to about 15 N/mm$^2$ as measured by the Modulus Test.

21. The article of claim 19, wherein the first anionic monomer is present in an amount less than about 3 mol. % of the polyvinyl alcohol (PVOH) resin blend.

22. The article of claim 19, wherein the article is in the form of a pouch defining an interior pouch volume, wherein the household care composition is contained in the interior pouch volume.

* * * * *